United States Patent [19]

Quatse

[11] Patent Number: 4,870,614
[45] Date of Patent: Sep. 26, 1989

[54] PROGRAMMABLE CONTROLLER ("PC") WITH CO-PROCESSING ARCHITECTURE

[76] Inventor: Jesse T. Quatse, 27 Venado Dr., Tiburon, Calif. 94920

[21] Appl. No.: 292,623

[22] Filed: Dec. 29, 1988

Related U.S. Application Data

[63] Continuation of Ser. No. 212,125, Jun. 27, 1985, abandoned, which is a continuation of Ser. No. 696,685, Jan. 29, 1985, abandoned, which is a continuation-in-part of Ser. No. 637,772, Aug. 2, 1984, Pat. No. 4,716,541.

[51] Int. Cl.⁴ .............................................. G06F 9/00
[52] U.S. Cl. ............................... 364/900; 364/931.4; 364/931.49
[58] Field of Search ............................. 364/200, 900

[56] References Cited

U.S. PATENT DOCUMENTS

| | | |
|---|---|---|
| 3,686,639 | 8/1972 | Fletcher et al. . |
| 3,813,649 | 5/1974 | Struger et al. . |
| 3,938,104 | 2/1976 | Henry et al. . |
| 3,942,158 | 3/1976 | Dummermuth . |
| 3,944,984 | 3/1976 | Morley et al. . |
| 3,953,834 | 4/1976 | Burkett et al. . |
| 3,978,454 | 8/1976 | Willard . |
| 4,021,783 | 5/1977 | Highberger . |
| 4,058,711 | 11/1977 | Ondercin et al. . |
| 4,070,702 | 1/1978 | Grants et al. . |
| 4,118,792 | 10/1978 | Struger et al. . |
| 4,122,519 | 10/1978 | Bielawski et al. . |
| 4,165,534 | 8/1979 | Dummermuth et al. . |
| 4,200,914 | 4/1980 | Kintner . |
| 4,200,915 | 4/1980 | Struger et al. . |
| 4,213,174 | 7/1980 | Morley et al. . |
| 4,215,395 | 7/1980 | Bunyard et al. . |
| 4,215,396 | 7/1980 | Henry et al. . |
| 4,215,398 | 7/1980 | Burkett et al. . |
| 4,215,399 | 7/1980 | Pavicic et al. . |
| 4,217,658 | 8/1980 | Henry et al. . |
| 4,228,495 | 10/1980 | Bernhard et al. . |
| 4,247,909 | 1/1981 | Bradley et al. . |
| 4,250,563 | 2/1981 | Struger . |
| 4,266,281 | 5/1981 | Struger . |

(List continued on next page.)

FOREIGN PATENT DOCUMENTS

| | | |
|---|---|---|
| 1103362 | 6/1981 | Canada . |
| 1103364 | 6/1981 | Canada . |
| 0092610 | 11/1983 | European Pat. Off. . |
| 3302902 | 8/1984 | Fed. Rep. of Germany . |
| 1339028 | 11/1973 | United Kingdom . |
| 2064920 | 6/1981 | United Kingdom . |
| 1596115 | 8/1981 | United Kingdom . |

OTHER PUBLICATIONS

"Mathematics Coprocessor: One Hundred Times Faster Than Software." (Translated from German).

*Primary Examiner*—Eddie P. Chan
*Assistant Examiner*—John G. Mills
*Attorney, Agent, or Firm*—Townsend and Townsend

[57] ABSTRACT

A programmable controller architecture utilizes specialized processors in a co-processing system so that each function is optimized. The system comprises first and second processors having respective instruction sets and respective associated means for fetching instructions from a common memory. Each of the processors and its instruction set is tailored to a corresponding processor's specialized function. Each processor's instruction set includes a subset of special instructions, the occurrence of one of which signifies that control is to be passed from one processor to the other. Upon encountering a special instruction within its special instruction subset, a given processor invokes associated control passing circuitry for suspending its own operation and commencing the operation of the other processor. The passage of control occurs very quickly so that the speed benefits of switching control are not lost in the overhead of such switching. Since passage of control renders one of the processors inactive, there is no requirement that the actual instructions of one processor be objectively distinguishable from those of the other.

13 Claims, 13 Drawing Sheets

Microfiche Appendix Included
(1 Microfiche, 23 Pages)

U.S. PATENT DOCUMENTS

| | | | |
|---|---|---|---|
| 4,270,167 | 5/1981 | Koehler et al. | 364/200 |
| 4,302,820 | 11/1981 | Struger . | |
| 4,482,948 | 11/1984 | Holden | 364/200 |
| 4,547,847 | 8/1984 | Louie et al. | 364/200 |
| 4,553,224 | 11/1985 | Struger et al. . | |
| 4,590,556 | 3/1986 | Berger et al. | 364/200 |
| 4,594,651 | 6/1986 | Jaswa et al. | 364/131 |
| 4,598,356 | 7/1986 | Dean et al. | 364/200 |
| 4,648,034 | 3/1987 | Hewinger | 364/200 |
| 4,677,433 | 7/1987 | Catlin et al. | 340/825.2 |
| 4,679,166 | 7/1987 | Berger et al. | 364/900 |
| 4,695,945 | 9/1987 | Irwin | 364/200 |
| 4,703,420 | 10/1987 | Irwin | 364/200 |
| 4,715,013 | 12/1987 | MacGregor et al. . | |
| 4,716,541 | 12/1987 | Quatsk | 364/900 |

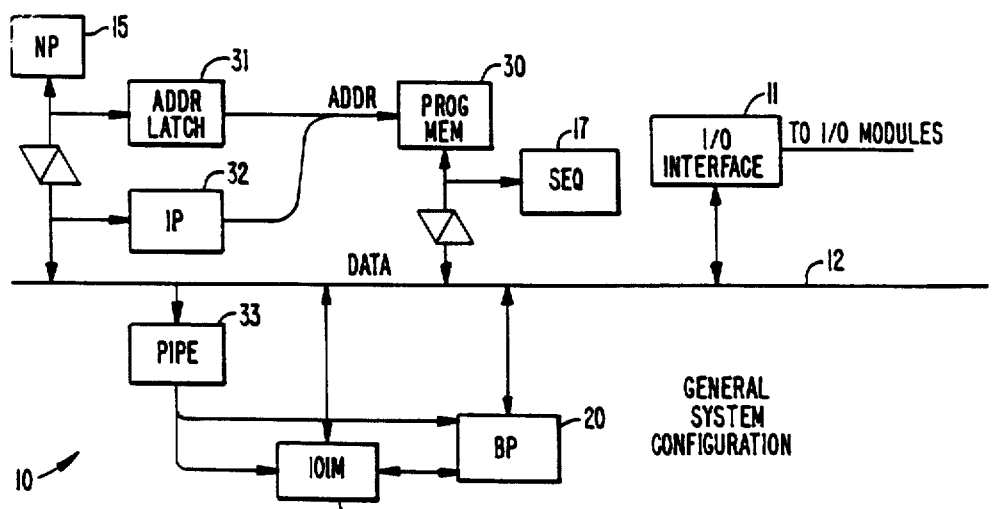
FIG._1.
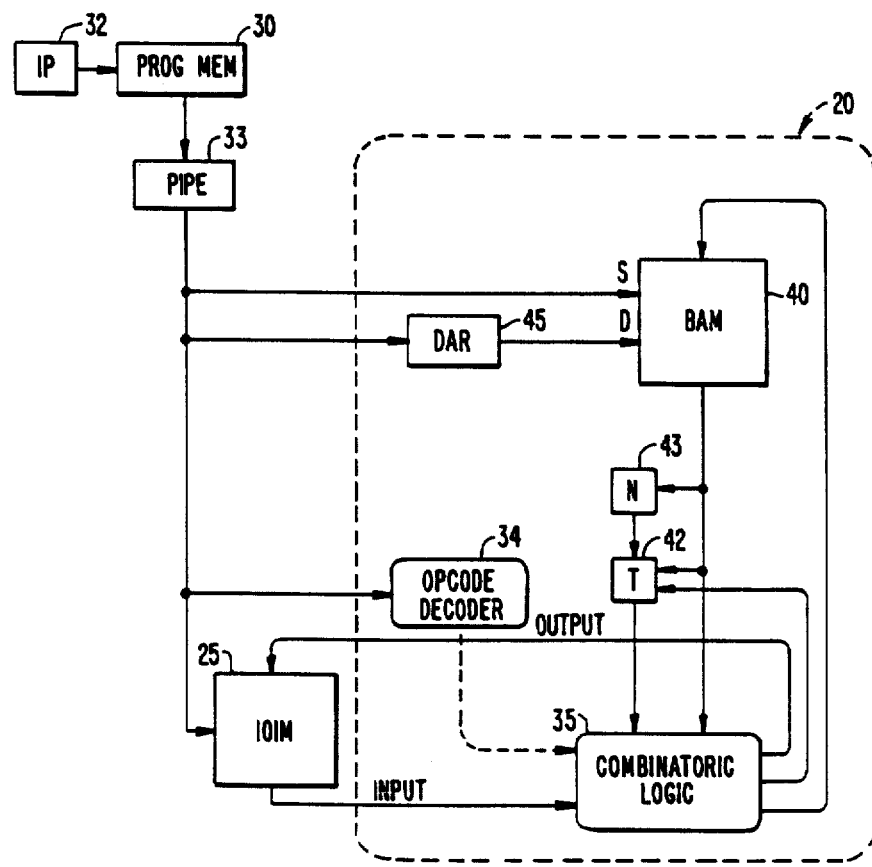
FIG._2.

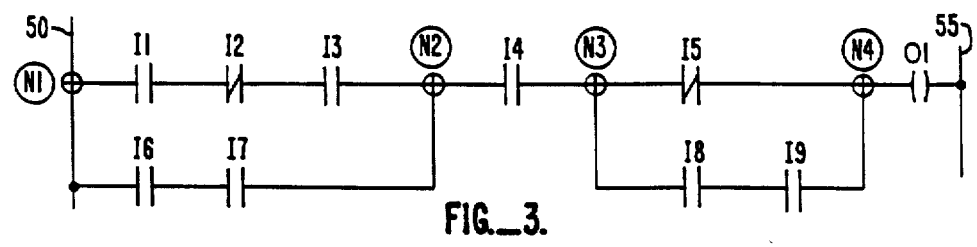
FIG._3.
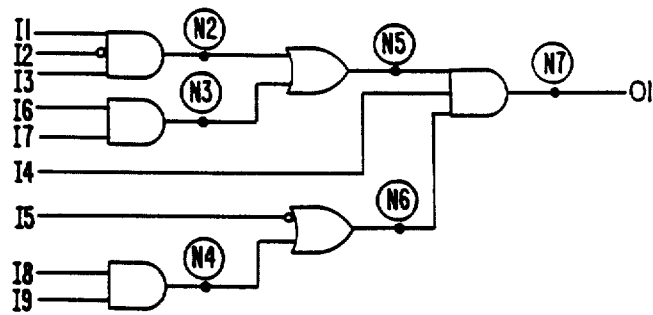
FIG._5.
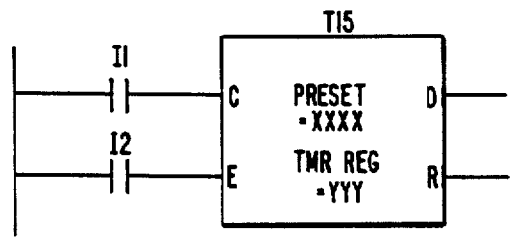
FIG._4A.
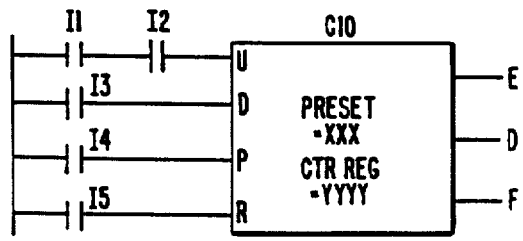
FIG._4B.

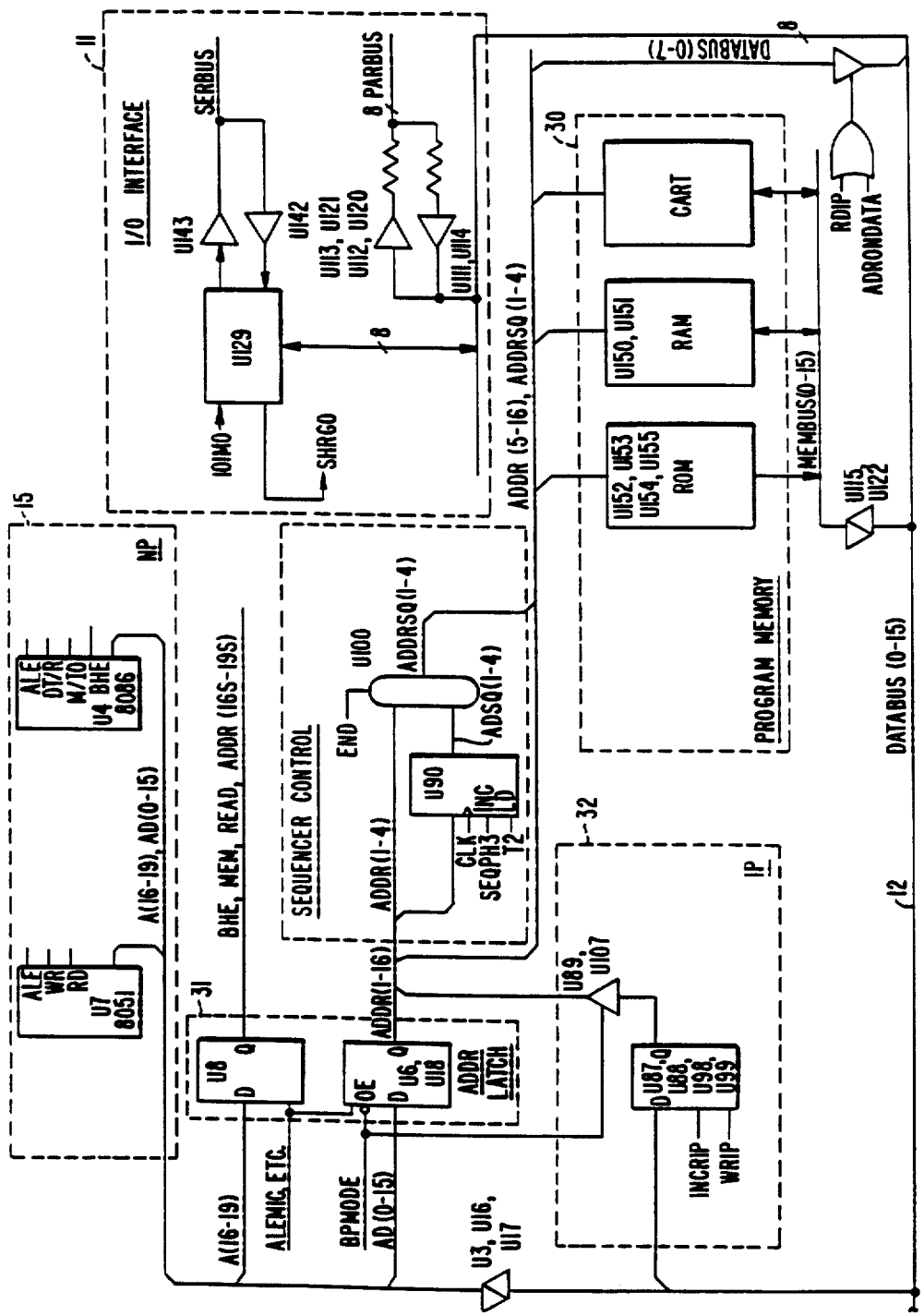
FIG._6.

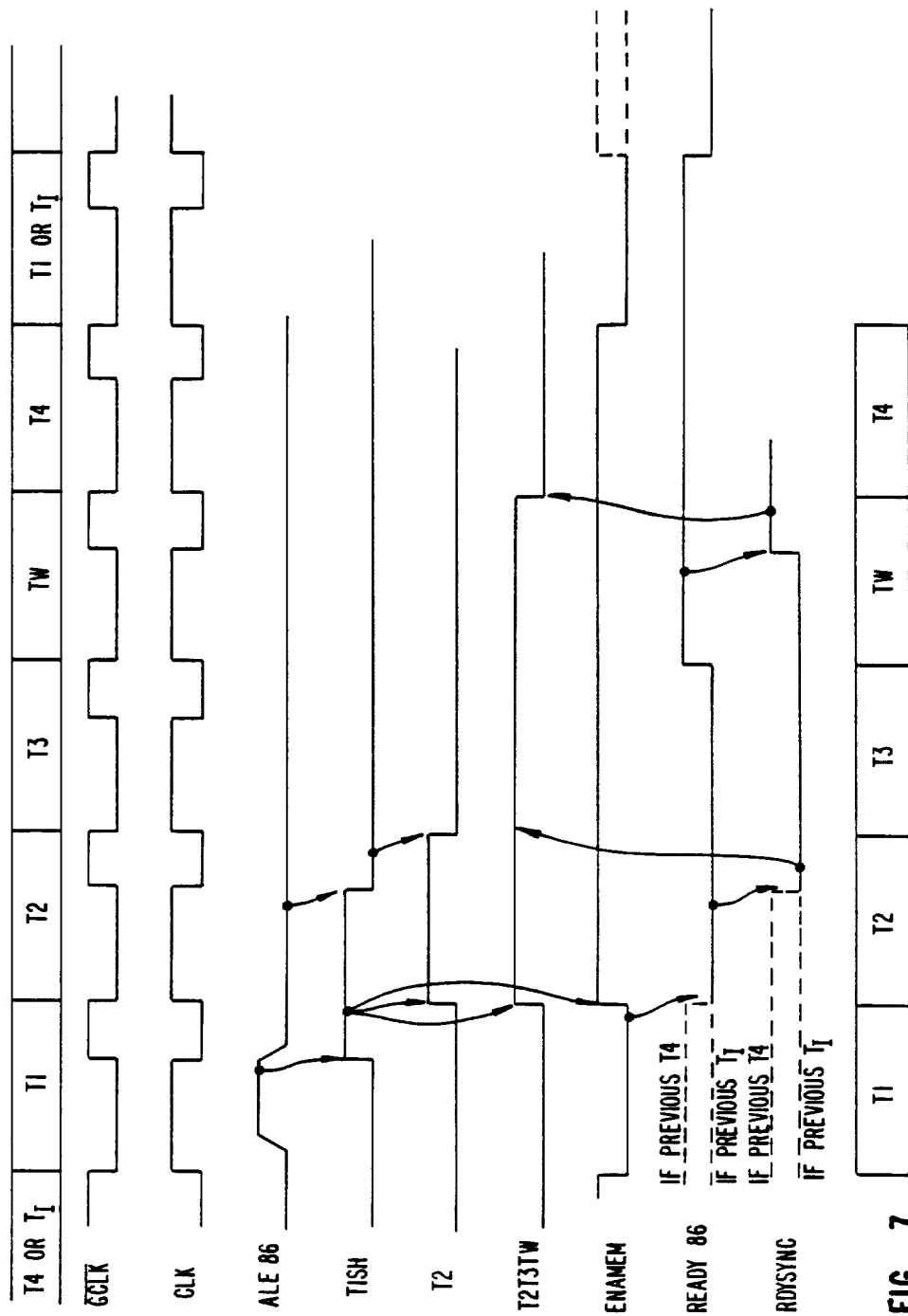
FIG._7.

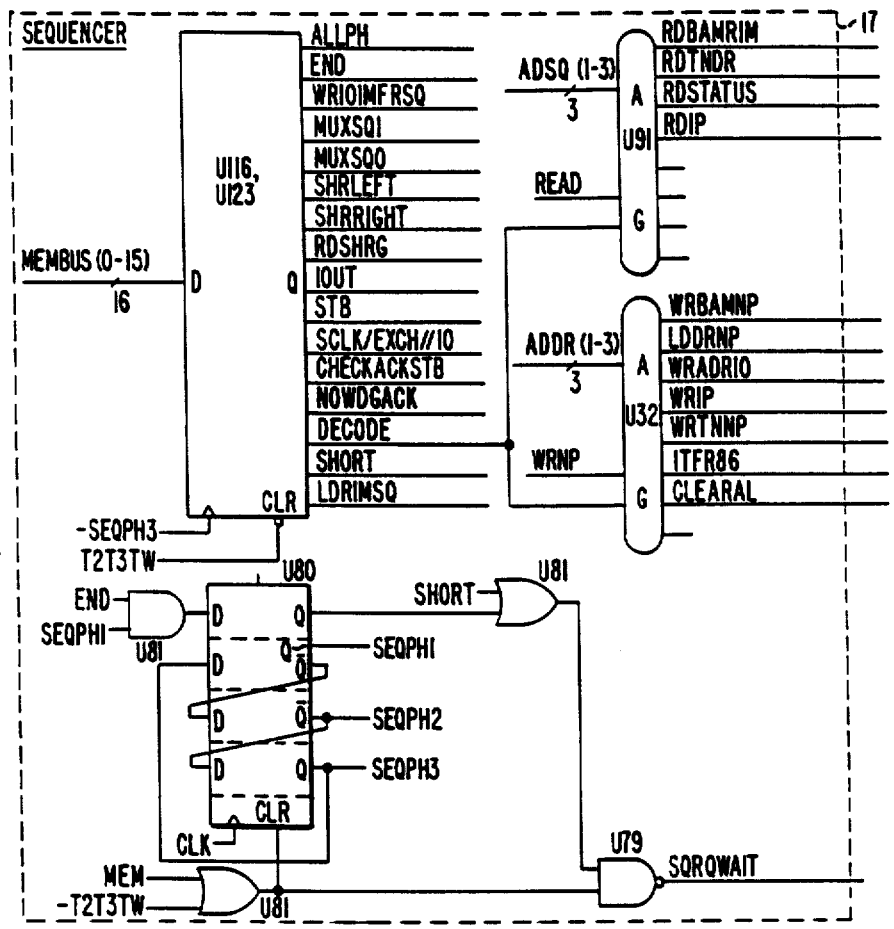
FIG._8.
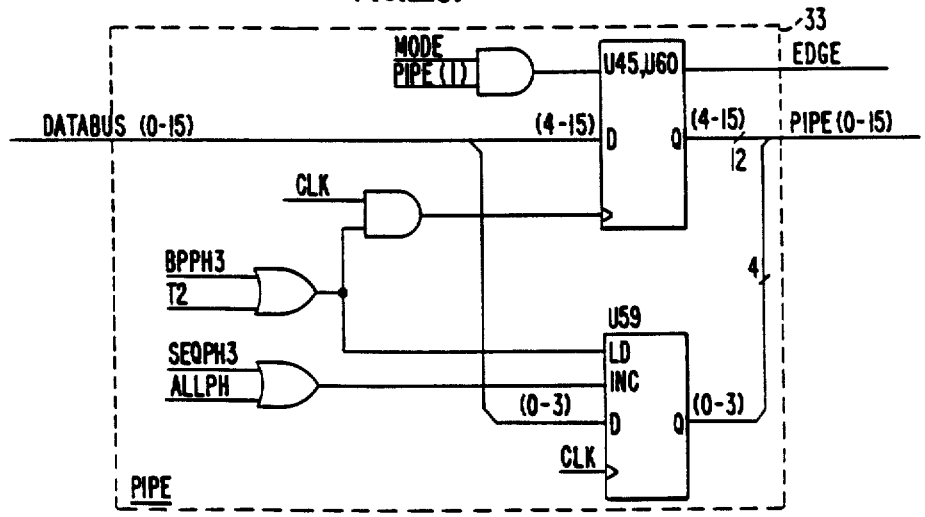
FIG._10.

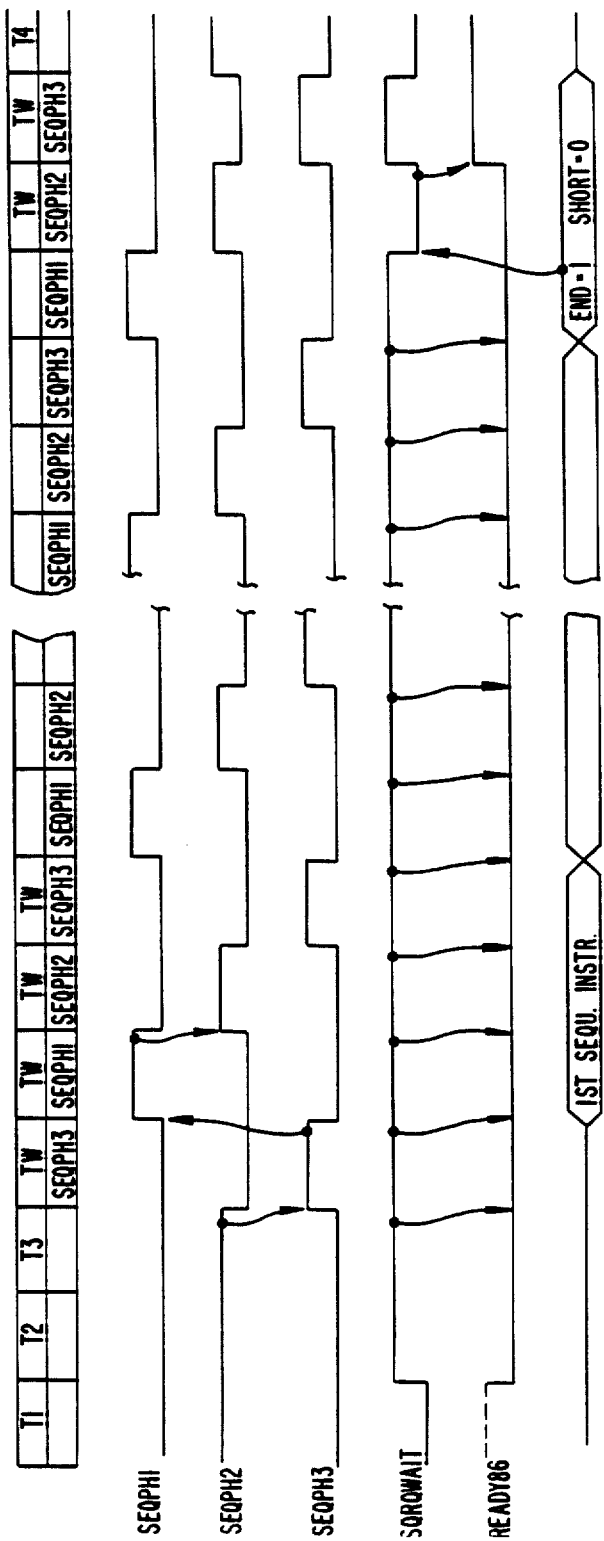
FIG._9.

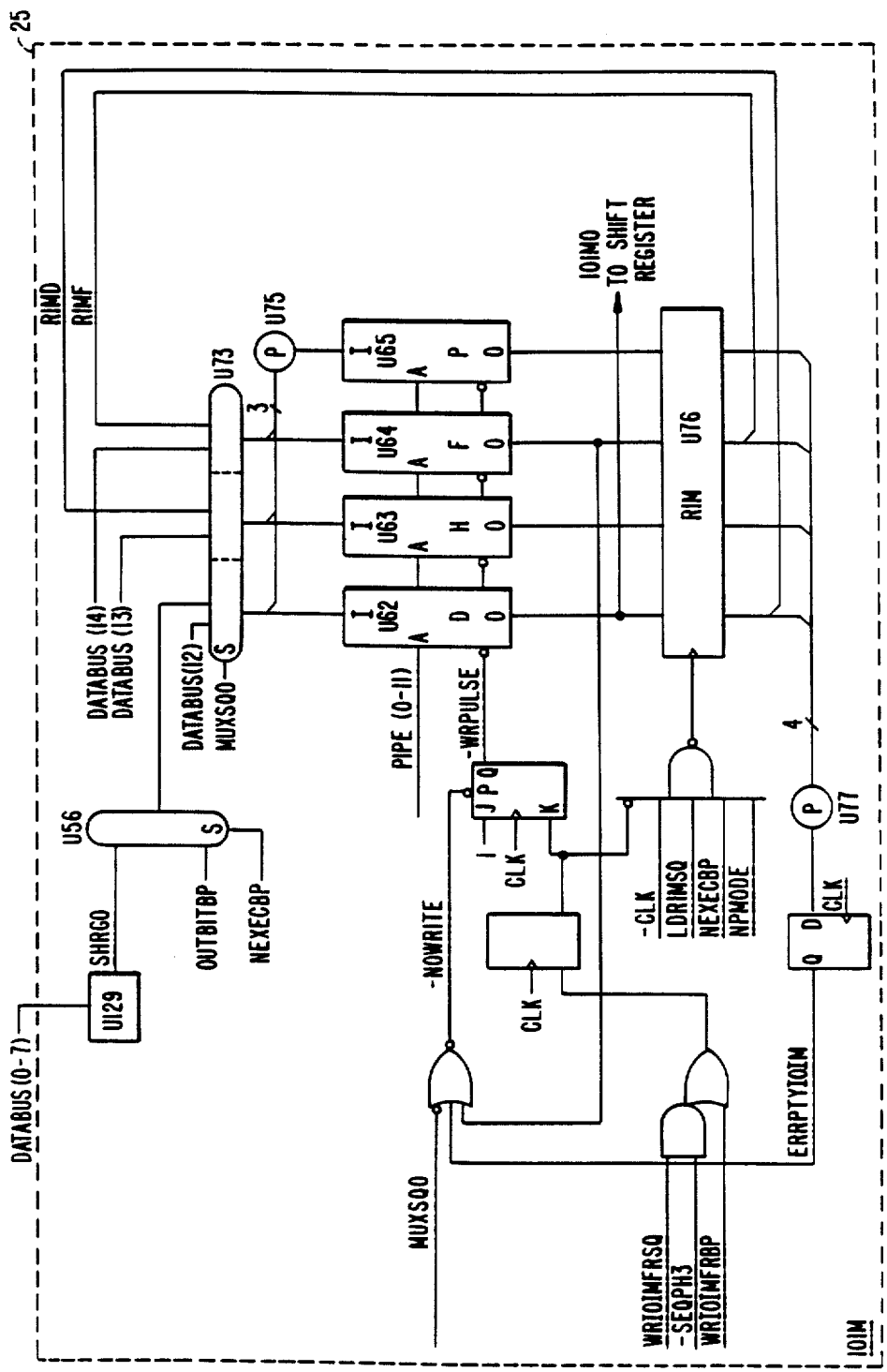
FIG._11.

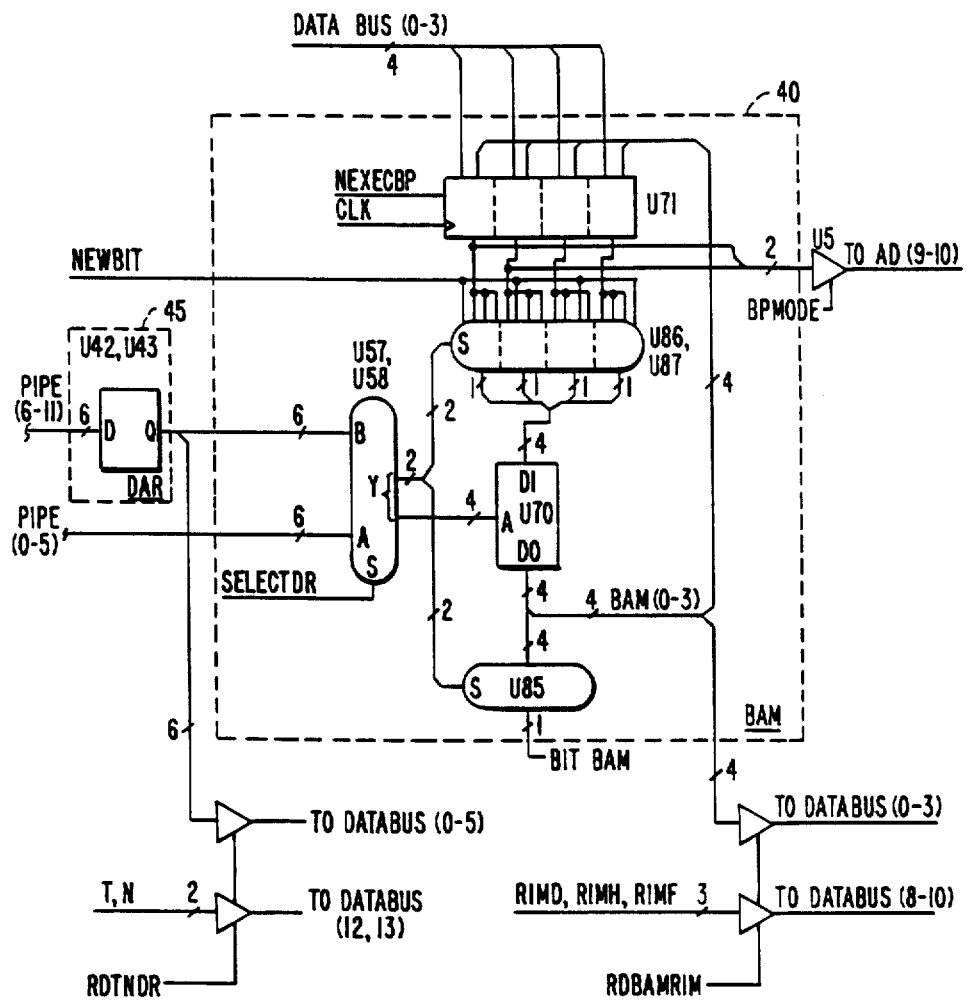
FIG._12.

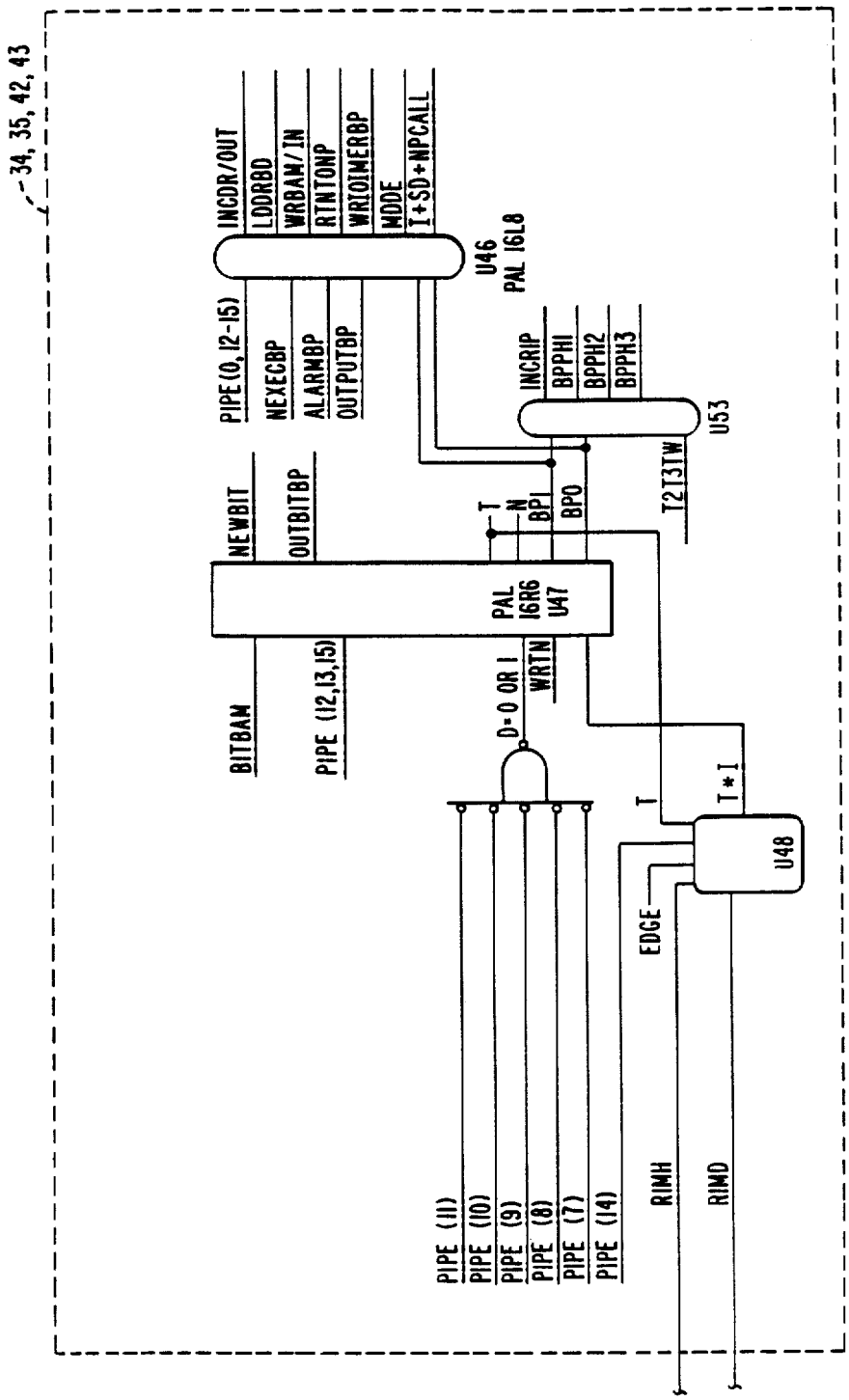
FIG._13.

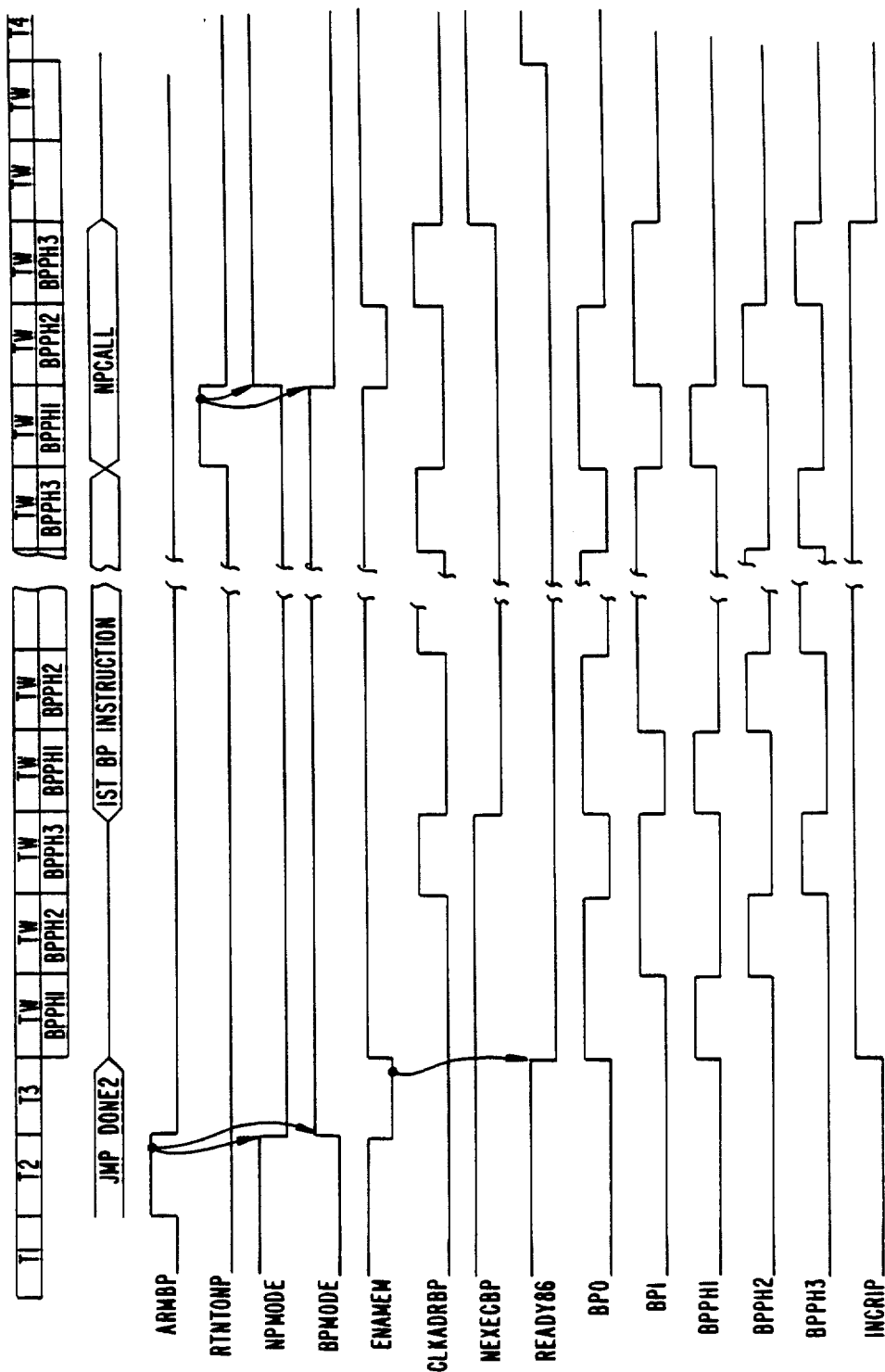
FIG._14.

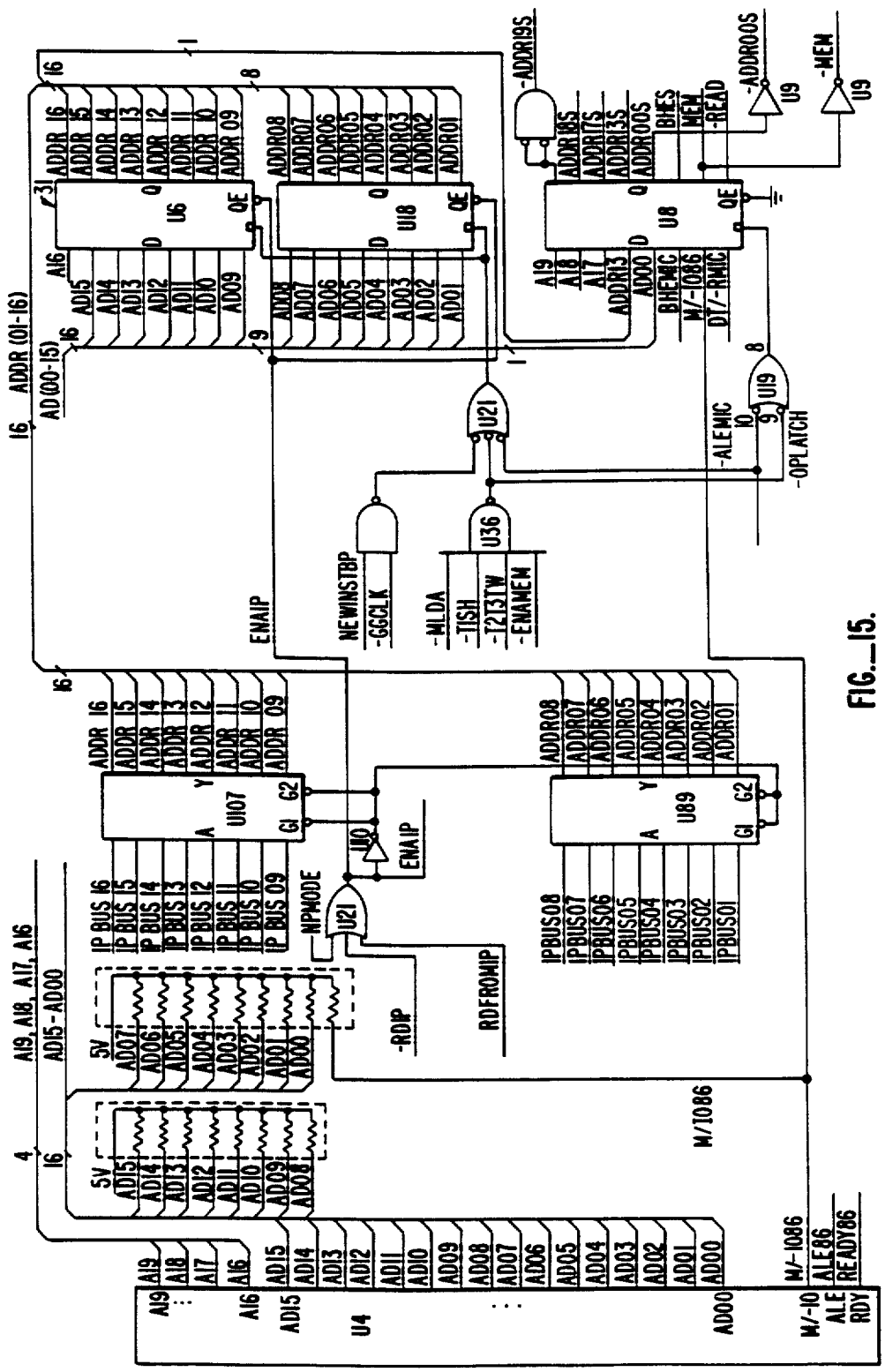
FIG._15.

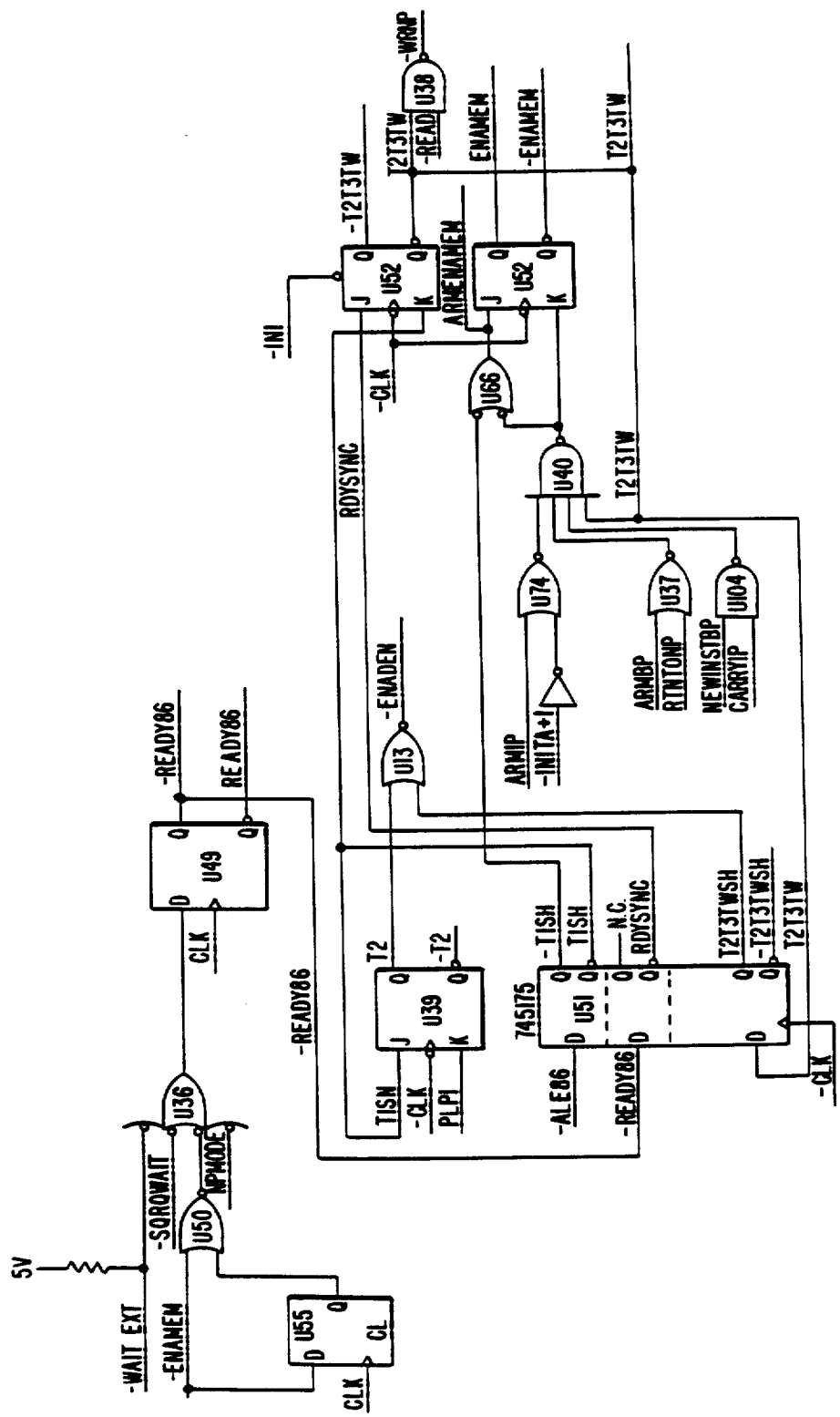
FIG._16.

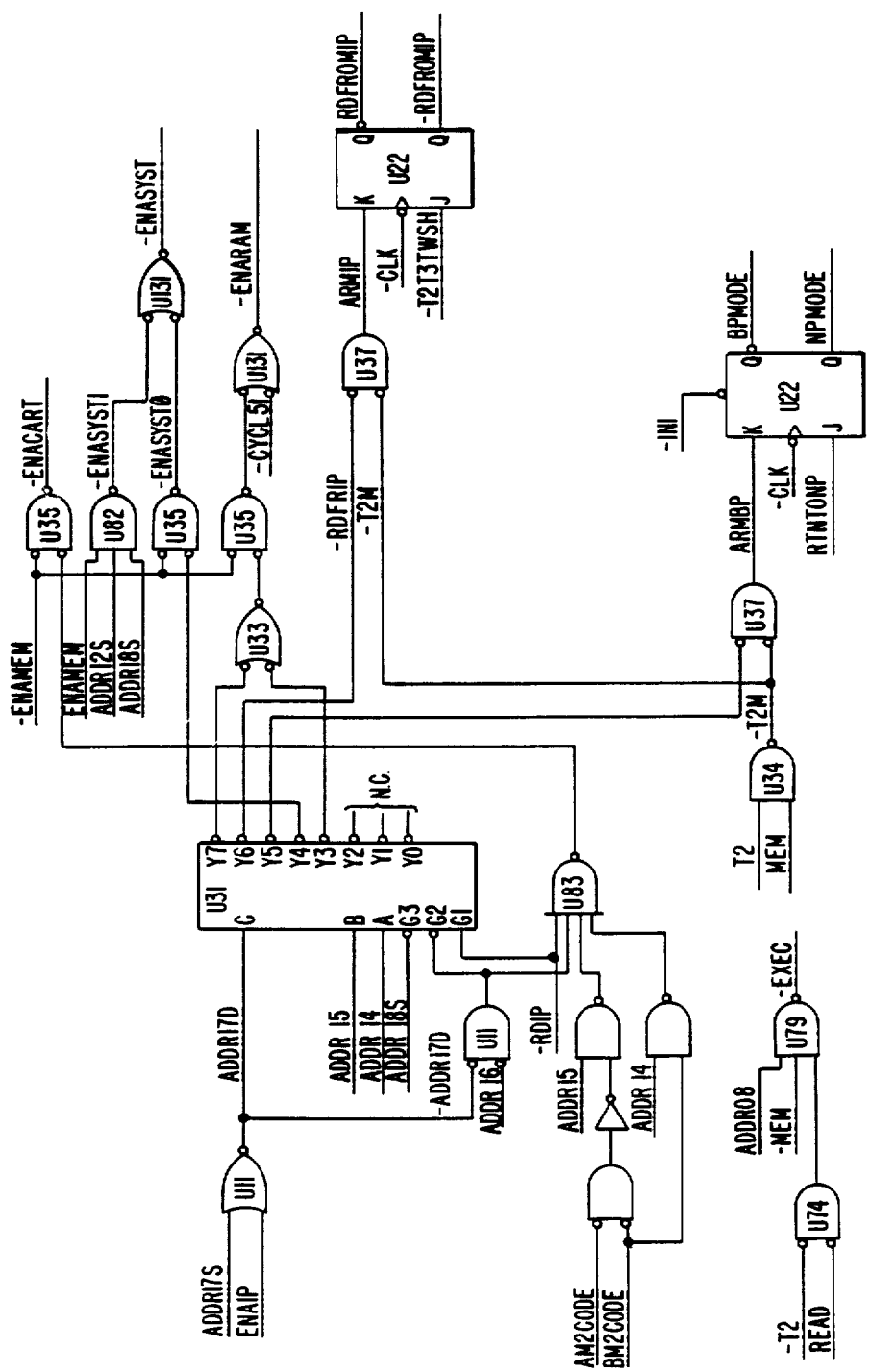
FIG._17.

PROGRAMMABLE CONTROLLER ("PC") WITH CO-PROCESSING ARCHITECTURE

This application is a continuation of Ser. No. 212,125, filed June 27, 1988, now abandoned; which application was a continuation of Ser. No. 696,685, filed Jan. 29, 1985, now abandoned; which application was a continuation-in-part of Ser. No. 637,772, filed Aug. 2, 1984, and issued as U.S. Pat. No. 4,716,541.

A microfiche appendix comprising a single microfiche having a total of 23 frames is filed herewith.

BACKGROUND OF THE INVENTION

It has become well-known practice to automate industrial processes by the use of a special purpose computer known as a programmable controller ("PC"). The PC periodically scans input variables from the process, performs suitable logical manipulations on the inputs and updates output variables for the process.

Reduced to bare essentials, the industrial process may be regarded as having a number of sensors and drivers. The sensors provide input values representative of the state of the process at a given time; the drivers respond to output values, and thereby control various aspects of the process. Some of the inputs and outputs are binary, corresponding to limit switches, relay contacts, proximity switches and the like, while others may be numeric, corresponding to temperatures, pressures, positions, and other physical parameters that characterize the process being controlled. However, it may be assumed that suitable interface modules have been provided so that the inputs and outputs appear to the PC as simple binary inputs and outputs.

Typically, there are a large number of input sensors and output drivers that must be serviced. While some large systems might have as many as 2000–4000 variables, 500 is a more representative number.

Despite the phenomenal advances in computer technology, general purpose computers are still too slow to scan the large numbers of inputs and update the outputs for the large systems required. Accordingly, a common PC configuration comprises a special purpose computer embedded within, or in some way coupled to, a general purpose computer. The special purpose computer performs the scan cycle (reading the inputs and computing the current value of the outputs) as rapidly as possible, while the general purpose computer attends to numerous calculations and communications with peripheral devices, terminals, and the like. The special purpose computer may be referred to as the "scan processor" or "scanner." Except where the distinction is important, the term "PC" will sometimes be applied to the scanner alone, and sometimes to the scanner and the general purpose computer together.

The current state of PC's reflects the prior practice of "programming" the system to be monitored and controlled by hard-wiring a representative relay logic ladder. The ladder would comprise a generally rectangular array of interconnected relay coils disposed between opposite contacts of a power supply. The state of any given relay contact would reflect the state of a corresponding switch to be monitored, and a given relay coil would control a corresponding driver to be actuated. The response time of such a system would be determined by the characteristic time for the closing of a relay, generally about 5-10 ms. The relays would often have multiple contacts to permit the corresponding input variable to be sensed at multiple places in the ladder.

In view of this historical development, programmable controllers evolved with a view to simulating such relay logic ladders. PC's are thus provided with a programming panel with which the programmer enters a graphical representation of the ladder into the computer memory. The graphical representation is then converted into some sort of internal instruction stream (i.e., is assembled or compiled) so that subsequent execution of the instructions in the stream causes the appropriate logical manipulations to be performed. The sensor and driver values are stored in a working memory, called an input/output image memory ("IOIM"), which is accessed by the PC.

While the PC clearly represents an advance over the hard-wired logic ladder, the PC cannot always match the ladder in speed, especially where relays have multiple contacts. Thus, for the PC to compete on a speed basis, it should be able to complete a scan cycle in the characteristic relay response time. However, even the currently obtainable PC's are often not fast enough to scan 4000 input occurrences (perhaps corresponding to fewer than 1000 actual inputs, each of which appears at several places in the program) in 5 ms. Therefore, for subsets of inputs and outputs that must be updated at shorter intervals than that of the scan cycle, corresponding portions of the program must be executed several times during a complete scan cycle.

As mentioned above, the PC operates according to a cycle that includes an input phase where the IOIM is updated to reflect changes in the sensor values, a processing phase wherein logical and numeric operations are carried out to update the IOIM values, and an output phase where the newly computed output variables are applied to the drivers. As alluded to above, general purpose microcomputers are generally too slow to carry out many of the tasks, and a shared processing regime must be employed.

The concept of dedicated processors for carrying out specialized tasks is not new. For example, a peripheral controller tied to a main processor often includes a dedicated processor that executes its own program from its own memory. Instructions and data are received from the main processor and are regarded as data that affect the peripheral processor's program operation.

Similarly, it is known practice to provide a co-processing regime where a main processor and a specialized processor execute instructions from a common memory. In one such regime, the two processors have respective instruction sets that are objectively distinguishable from each other. Each instruction is fetched and examined by both processors, and depending on the set to which the instruction set belongs, one processor or the other will execute the instruction. A variant of this uses a transitional instruction to determine which processor is to take control. For example, a microprocessor such as an Intel 8086 may be operated in conjunction with a special numeric processor such as an Intel 8087. In such a case, the 8086 and 8087 share program memory and local bus resources. Passage of control from the 8086 to the 8087 occurs by means of a particular memory access instruction called the ESCAPE instruction. While the 8086 is fetching and executing instructions, the 8087 tests each instruction, and is activated upon encountering an ESCAPE instruction. After execution of the ESCAPE instruction by the 8086, the 8086 and the 8087 continue executing their specific tasks in parallel. A more complete description of the 8086 and its co-processor capability may be found in "The 8086 Book", R. Rector, George Alexy (Osborne/McGraw Hill 1980) at pages 3-107, 10-2, and 10-3.

In considering the design of a PC, there are a number of apparently mundane considerations that turn out to represent fairly fundamental constraints. The choice of word length is an example of this. Given that most digital logic is carried out in 8-bit multiples, a word length that is an 8-bit multiple is strongly indicated. For a PC that includes a special purpose computer operating in conjunction with a general purpose computer, some of the characteristics of the general purpose computer are imposed on the special purpose computer. This militates strongly in favor of a 16-bit word, given the current generation of microprocessors.

Once the appropriate word length is decided, the sizes of systems that must be controlled further constrain the allocation of bits within the word. Of the 16 bits, a 12-bit address field (to address 4000 contacts) may be considered to be a practical necessity, although many systems may only require 1000-2000 contacts. Even so, larger systems might require more than 4000 contacts to be addressed, thereby necessitating some sort of extended address scheme. With a 12-bit address field, the opcode has only 4 bits.

Thus the special purpose computer in the PC system requires all sixteen bits of the word length to specify the opcode and address. Therefore, there can be no requirement that the instructions for the general purpose computer be distinguishable from the instructions for the special purpose computer.

A major objective of almost any innovative design is to produce the best adapted functionality at lowest possible cost. The complexity in terms of component count of a given implementation effects both, especially when one considers that a major component of functionality is reliability, which is dramatically impacted by component count. This is especially true for programmable controllers, which are intended for application in harsh environments, notably those where heat poses a threat to the reliability of electronic components. A large component count clearly contributes to the problem, because the component dissipation contributes significantly to the ambient heat, resulting in exponential degradation of reliability with increases in component count.

SUMMARY OF THE INVENTION

The present invention provides a programmable controller architecture that is characterized by very fast and efficient operation.

Broadly, this is accomplished through the cooperation of specialized processors in a co-processing system so that each function is optimized. A system according to the present invention comprises first and second processors having respective instruction sets and respective associated means for fetching instructions from a common memory. Each of the processors and its instruction set is tailored to a corresponding processor's specialized function. Each processor's instruction set includes a subset of special instructions, the occurrence of one of which signifies that control is to be passed from one processor to the other. Upon encountering a special instruction within its special instruction subset, a given processor invokes associated control passing circuitry for suspending its own operation and commencing the operation of the other processor. The passage of control occurs very quickly so that the speed benefits of switching control are not lost in the overhead of such switching. Since passage of control renders one of the processors inactive, there is no requirement that the actual instructions of one processor be objectively distinguishable from those of the other.

According to a first aspect of the invention, the first processor is a general purpose computer having a numeric processor ("NP") and the second processor is a specialized logic or Boolean processor ("BP") or scanner. The NP may be a standard microprocessor having an instruction set rendering it well-suited for carrying out numerical calculations and a number of general purpose manipulations. The BP has an instruction set that renders it especially efficient for manipulating large numbers of logical variables in one ore more highly-structured logic representations.

In the preferred embodiment, the mechanism of passing control from the BP to the NP entails the NP's attempting a branch and the control circuitry's withholding the destination address. Passage of control from the BP to the NP occurs via a subroutine call (NPCALL) and entails providing the NP with the destination address so that it can complete the branch it had commenced when last deactivated.

The NP special instruction subset is defined to include an indirect addressing reference through an identifiable address, in particular a jump indirect to a memory location in a specific range (designated DONE). Prior to passing control to the BP, the NP sets up certain control information or previous state information into registers for that purpose. For example, the starting address for the BP is loaded into a BP instruction pointer. The NP then begins to execute the indirect jump. Associated control passing circuitry senses the characteristic address, places the NP in an inactive state, and starts the BP. The particular mechanism for deactivating the NP is to control the READY line to specify that the addressed logic (in this case memory) is not ready.

The BP special instructions are subroutine calls (called NPCALLs). The NPCALL instruction operates to provide the address that the NP was waiting for when it attempted to access the memory location DONE to find the destination for the branch. Various bits from the NPCALL instruction are combined with bits from the BP's own working memory to obtain an address of an entry in a vector table. The content of that address in the table is provided as the destination for the NP's inprogress jump.

According to a second aspect of the invention, the functions may be further allocated within the general purpose computer. In this case, certain functions of the general purpose computer are allocated between the numeric processor (NP) and a specialized I/O processor, implemented as a sequencer in a preferred embodiment. The sequencer instruction set renders the sequencer especially well-suited for controlling I/O bus communications by managing the timing of the control, data, and strobe signals on the I/O bus. The NP instruction set, on the other hand, is optimized for other functions and is not especially well-suited for carrying out these bus protocols in a highly efficient manner.

Passage of control from the NP to the sequencer entails the NP's attempting to execute one of its native I/O instructions (I/O mapped data bus access), and the control circuitry's controlling the NP's READY line to specify that the accessed logic is not ready.

The special instruction subset for specifying passage of control from the NP to the sequencer are the NP's native I/O instructions. The execution of such an instruction has the effect of setting a bit specifying that an I/O (rather than a memory) data bus access is made. The associated control passing circuitry senses this bit, places the NP in an inactive state, and starts the sequencer. Stopping the NP in the middle of the I/O mapped data bus access has the effect of freezing the NP's address and data bus outputs in order to provide control information, notably sequencer programming address information, to the sequencer. In effect, the NP is latched, thereby obviating the need for additional registers.

The sequencer special instruction set includes so-called END and SHORT instructions signifying that control is to be passed back to the NP. The control circuitry senses these, stops the sequencer, and controls the NP's READY line accordingly.

In effect, the NP's I/O instructions may be viewed as subroutine calls, except that the subroutines are actually executed by the IOP.

A further understanding of the nature and advantages of the present invention may be realized by reference to the remaining portions of the specification and attached drawings.

BRIEF DESCRIPTION OF THE DRAWINGS

FIG. 1 is a block diagram of a programmable controller ("PC") according to the present invention;

FIG. 2 is a block diagram of the Boolean processor ("BP") of the present invention;

FIG. 3 shows an example of a ladder diagram to be compiled and solved;

FIGS. 4A and 4B show examples of function boxes that may be embedded in a ladder diagram;

FIG. 5 shows a logigram diagram corresponding to the ladder diagram of FIG. 3;

FIG. 6 is a simplified circuit schematic of the numeric processor ("NP") and program memory subsystems;

FIG. 7 is a timing diagram illustrating NP memory access;

FIG. 8 is a simplified circuit schematic of the sequencer subsystem;

FIG. 9 is a timing diagram illustrating sequencer operation;

FIG. 10 is a simplified circuit schematic of the pipeline register for the Boolean processor ("BP");

FIG. 11 is a simplified circuit schematic of the I/O image memory ("IOIM") subsystem;

FIG. 12 is a simplified circuit schematic of the binary accumulator memory ("BAM") subsystem;

FIG. 13 is a simplified circuit schematic of the BP logic;

FIG. 14 is a timing diagram illustrating BP operation; and

FIGS. 15-17 are circuit schematics showing portions of the NP, NP control circuitry, BP/NP control circuitry, and memory control circuitry.

DESCRIPTION OF THE PREFERRED EMBODIMENTS

Overview and General Operation

FIG. 1 is a block diagram of a typical programmable controller system ("PC") 10 in which the present invention may be implemented. PC 10 operates to monitor and control an industrial process, and to that end, a plurality of I/O modules (not shown) are connected to actual sensors and drivers associated with the process. The modules communicate via serial and parallel buses through an I/O interface 11 with a system data bus 12 to which are also coupled a number of processors and memories. The processors include a numeric processor ("NP") 15, a sequencer 17, and a logic or Boolean processor ("BP") 20. The memories include an I/O image memory ("IOIM") 25 and a program memory 30.

As is known, some of the IOIM locations correspond to input variables from sensors, and others correspond to output variables from drivers, and others correspond to program and status variables. Generally, PC 10 operates cyclically according to a cycle which includes the following:

(a) an input phase wherein IOIM 25 is updated to reflect changes sensed at the I/O modules;

(b) a processing phase wherein NP 15 and BP 20 carry out logical and arithmetic manipulations based on the input variables in IOIM 25 according to programs stored in program memory 30 and update the output variables in IOIM 25; and (c) an output phase wherein the I/O modules are updated according to newly computed values of output variables in IOIM 25.

Once the system is running, the output and input phases may be considered to form a single I/O exchange phase.

As will be more fully developed below, NP 15, sequencer 17, and BP 20 operate according to a co-processing regime wherein only one processor is operating at a given moment. When one processor is running, it fetches instructions from program memory 30. Control is passed from NP 15 to BP 20 (or vice versa), or from NP 15 to sequencer 17 (or vice versa) by special instructions embedded in the instruction stream.

In a global sense, each of the processors may be thought of as a processor that is well suited for certain tasks and not well suited for others. Thus the instruction set of NP 15 is tailored to numerical operations and operating system functions, that of sequencer 17 to I/O operations and miscellaneous control functions, and that of BP 20 to logical or Boolean operations. In this connection, it is noted that from the point of view of BP 20, sequencer 17 can be viewed as an adjunct I/O processor for NP 15.

The processors and memories are coupled to system data bus 12 through various buffers and holding registers. Addresses for NP instructions are generated in NP 15 and latched in an address latch 31. Addresses for BP instructions are set up in an instruction pointer ("IP") 32. When BP 20 is running, the BP instruction is read from memory 30 onto system data bus 12, and is held in a register 33, called the PIPE register. This allows a new instruction to be fetched from program memory 30 while the instruction in PIPE register 33 is being executed.

The bulk of the discussion from this point on will deal with the manner in which BP 20 (and to a lesser extent NP 15) operate to solve diagrams in ladder or logigram representation or solve expressions in Boolean representation. That is, the discussion will focus on the processing phase.

Boolean Processor Organization and Memory Elements

FIG. 2 is a simplified block diagram illustrating the basic organization and memory elements of Boolean processor ("BP") 20. As alluded to above, the logical or numeric states of sensors and drivers are stored as bits in IOIM 25 and are manipulated by BP 20. The programs executed by BP 20 correspond to the particular ladder or logigram diagram or Boolean expression to be solved. Prior to execution, a diagram or expression will have been compiled to generate an instruction stream in program memory 30. During execution, BP 20 fetches instructions from program memory 30, as addressed by IP 32.

In the preferred embodiment, the instruction fetched from program memory 30 is a 16-bit word comprising a 4-bit opcode field and a 12-bit operand field which has different significance for different types of instructions. While a complete description of the instruction set and manner in which diagrams and expressions are compiled will be set forth below, it suffices at this point to note that instructions belong to one of four classes: input, structure, mode, and NPCALL. The two main types of instructions used to execute ladder, logigram, or Boolean representations are input instructions and structure instructions.

BP 20 includes an opcode decoder 34 with combinatoric logic 35, and a number of memory elements. The memory elements include a binary accumulator memory ("BAM") 40, a T-register 42, an N-register 43, and a destination address register ("DAR") 45. The operands (S,D) of a structure instruction are a 6-bit source address in BAM 40 from which an initial operand is taken and a 6-bit destination address in BAM 40 in which the result of an operation is stored. The operand (I) of an input instruction is a 12-bit address in IOIM 25 from which an input variable (an "IOIM bit") is taken.

Broadly, the locations in BAM 40 correspond to nodes on the diagram or Boolean values at different levels in a stack being executed. A given location in BAM 40 will sometimes be denoted BAM(N) where N is the address of the location. T-register 42 holds the temporary result of sequential AND operations. N-register 43 holds the initial Boolean value of the T-register content. Sometimes the contents of T-register 42 and N-register 43 will simply be denoted T and N, respectively.

The discussion will often utilize the usual convention where $<X>$ denotes the content of X. Thus, $<DAR>$ is the content of DAR 45 which is an address in BAM 40, and $<<DAR>>$ is the content of that address in BAM which is a value (bit) in BAM (a "BAM bit"). For reasons that will appear below, the first two locations in BAM 40 are initialized to 0 and 1. Thus $<0>=0$ and $<1>=1$.

The execution of an input instruction entails the logical combination of an IOIM bit with one or more of T and a BAM bit. When opcode decoder 32 determines that the instruction fetched from program memory 30 is an input instruction, the 12-bit address field is communicated to address inputs of IOIM 25 whereupon the addressed bit is communciated to combinatoric logic 35. Opcode decoder 34 provides appropriate control signals to combinatoric logic 35 so that the newly provided input is appropriately combined with other variables.

The structure instructions operate on the pair of address S and D, and either describe the structure of a diagram to be compiled or permit logical functions to be performed between nodes on the diagram. When a structure instruction is fetched from program memory 30, the 6-bit source address S is communicated to address inputs of BAM 40 while the destination address D is loaded into DAR 45 for later communication to the address inputs of BAM 40. When the source address is provided at the address inputs of BAM 40, the addressed bit is made available to one or more of T-register 42, N-register 43, and combinatoric logic 35. In most cases, when the content of DAR 45 is applied to the address inputs of BAM 40, the addressed bit is supplied to combinatoric logic 35 or overwritten with the result of a logical combination.

Mode instructions are used for edge (change of state) detection of input variables and transfers from BAM 40 to IOIM 25 (to update variables corresponding to output coils). For certain embodiments, mode instructions permit extension of the address space.

The NPCALL (Numeric Processor CALL) instructions provide for communication between BP 20 and NP 15, the latter of which provides communications beyond BP 20. Except for some initializing and state-saving data paths, NP 15 and BP 20 communicate through BAM 40 and the NPCALL instruction. Upon decoding an NPCALL instruction, BP 20 halts and passes control to NP 15 at the address specified by the NPCALL instruction. The address is vectored through 2 bits of BAM 40, so that the specified NPCALL is entered at one of four addresses, depending upon the 2 bits as addressed by DAR 45. The purpose of this four-way vector is a fast test of the contents of BAM 40 so that numeric operations invoked by the NPCALL, and whose particular operation depends upon the contents of BAM, can execute more rapidly.

The particular sequence of operations and transfers in Boolean processor 20 may best be understood in connection with the following detailed description of the instruction set.

Boolean Processor Instruction Set

An instruction fetched from program memory 30 belongs to one of four classes, input, structure, mode, and NPCALL.

The input instructions have a bit allocation as follows:

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| 1  | C  | F  | F  |    |    |   |   | A |   |   |   |   |   |   |   |

A is a 12-bit address field which represents an address in IOIM 25. The actual portion of the field that is used varies according to particular implementations, and in fact the addressable space may actually be extended by use of the mode instructions to be discussed below.

C is a 1-bit field specifying the Boolean sense of the input variable. If there was no preceding mode instruction, C has the following effect on I:

| C | OPERAND |
|---|---------|
| 0 | I = $<A>$ |
| 1 | I = $/<A>$ |

If the preceding instruction specified the edge detection mode, C has the following effect.

| C | OPERAND |
|---|---------|
| 0 | I = rising edge of $<A>$ |
| 1 | I = falling edge of $<A>$ | where I is the value to be passed to combinatoric logic 35.

F is a 2-bit field specifying the particular input instruction to be executed. The effect of the input instructions may be summarized as follows (D is the address in BAM 40 currently specified by destination register 45):

| NAME | F | MNEMONIC | OPERATION |
|---|---|---|---|
| STACK | 00 | STK,I | $<D + 1> \leftarrow T * I$ <br> $D \leftarrow D + (\text{plus}) 1$ <br> $T \leftarrow N$ |
| AND D | 01 | AD,I | $<D> \leftarrow <D> * T * I$ <br> $T \leftarrow N$ |
| AND-OR D | 10 | AOD,I | $<D> \leftarrow <D> + (OR) T * I$ <br> $T \leftarrow N$ |
| AND T | 11 | AT,I | $T \leftarrow T * I$ |

The STACK instruction increments the contents of DAR 45, AND's the contents of T-register 42 and the addressed input variable, stores the result in the BAM location having the newly incremented address, and stores the content of N-register 43 in T-register 42.

The AND D instruction AND's the input variable, the contents of T-register 42, and the content of the BAM locatiin pointed to by DAR 45, stores the result back in the BAM location, and stores the content of N-register 43 in T-register 42.

The AND-OR D instruction AND's the addressed input variable and the content of T-register 42, OR's this result with the content of the BAM location pointed to by DAR 45, stores the result back in the BAM location, and stores the content of N-register 43 in T-register 42.

The AND T instruction AND's the addressed input variable and the content of T-register 42, and stores the result back in T-register 42.

The structure instructions have a bit allocation as follows:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | F | | D | | | | | | S | | | | | |

S is a 6-bit field specifying the address of the bit in BAM 40 which is used as the source bit for the current structure instruction.

D is a 6-bit field specifying the address of the destination bit in BAM 40 for the current structure instruction and the new value to be stored in DAR 45 for subsequent input instructions.

As mentioned above, the values of BAM addresses 0 and 1 have special meaning. The power-up initializing sequence always stores a zero value in BAM(0) and a one in BAM(1).

F is a 2-bit field specifying the particular structure instruction to be executed. The effect of the structure instructions may be summarized as follows:

| NAME | F | MNEMONIC | OPERATION |
|---|---|---|---|
| INIT | 11 | I,S,D | If D = 0 or 1: <br> no change of $<D>$ <br> no change of $<DAR>$ <br> $N \leftarrow <S>, T \leftarrow <S>$ <br> If D $\neq$ 0 or 1: <br> $<D> \leftarrow 0$ <br> $<DAR> \leftarrow D$ <br> $N \leftarrow <S>, T \leftarrow <S>$ |
| AND | 10 | A,S,D | If D = 0 or 1: <br> no change of $<D>$ <br> no change of $<DAR>$ <br> $N \leftarrow 1, T \leftarrow 1$ <br> If D $\neq$ 0 or 1: <br> $<D> \leftarrow <D> * <S>$ <br> $<DAR> \leftarrow D$ <br> $N \leftarrow 1, T \leftarrow 1$ |
| OR | 01 | O,S,D | If D = 0 or 1: <br> no change of $<D>$ <br> no change of $<DAR>$ <br> $N \leftarrow 1, T \leftarrow 1$ <br> If D $\neq$ 0 or 1: <br> $<D> \leftarrow <D> + <S>$ <br> $<DAR> \leftarrow D$ <br> $N \leftarrow 1, T \leftarrow 1$ |
| NOT | 00 | N,S,D | If D = 0 or 1: <br> no change of $<D>$ <br> no change of $<DAR>$ <br> $N \leftarrow 1, T \leftarrow 1$ <br> If D $\neq$ 0 or 1: <br> $<D> \leftarrow /<S>$ <br> $<DAR> \leftarrow D$ <br> $N \leftarrow 1, T \leftarrow 1$ |

All structure instructions initialize N-register 43 and T-register 42 (to the source bit in BAM for INIT and to 1 for the other three instructions). However, the operation is different depending on the value of D. If D is 0 or 1, the structure instructions do not change the destination bit in BAM 40 or the content of DAR 45.

Where the destination address is neither 0 nor 1, the destination address D is loaded into DAR 45 and the destination bit in BAM is overwritten. INIT zero's the destination bit in BAM; AND AND's the source bit and the destinatiin bit and overwrites the destination bit with the result; OR OR's the source bit and the destination bit and overwrites the destination bit with the result; and NOT complements the source bit and overwrites the destination bit with the result.

The mode instructions have a bit allocation as follows:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | | P | | | | | | M | | | | |

P is a 6-bit field defining the parameter, if any, of the mode instruction.

M is a 6-bit field specifying the mode to be effected, as summarized below:

| M | OPERATION |
|---|---|
| 00XX00 | NOP |
| 00XXX1 | OUTPUT |
| 00XX10 | EDGE |

The NOP (no operation) instruction is executed without any effect. The state of BP 20 remains the same, except that IP 31 is incremented.

The EDGE mode instruction has effect only if the following instruction is an input instruction. In such a case, the operand of the input instruction (which is an address in IOIM 25) is edge detected. An edge-detected input variable is true only for a scan cycle in which the input variable changed its value relative to its value during the previous scan cycle. The sense of the transition that is significant is determined by the C field in the input instruction. The EDGE instruction affects only the next instruction in sequence so that if the EDGE instruction precedes two contiguous input instructions, only the first is affected.

The OUTPUT mode instruction operates to transfer variables from BAM 40 to IOIM 25 according to parameters in the OUTPUT instruction itself and in a list of words immediately following. The OUTPUT instruction and its output list have a bit allocation as follows:

```
       15 14 13 12 11 10 9 8 7 6 5 4 3 2 1 0
       0  0  0  0        S      0 0 X X X 1
List:  0  N  T                   A
       0  N  T                   A
                         :
       1  N  T                   A
```

The ords following the output instruction, up to and including the first appearance of a "1" in bit(15), form the output list. The extent of the output list is defined by bit(15), and the output mode instruction transfers variables from BAM 40 to IOIM 25 so long as bit(15) is 0.

S is a 6-bit field specifying the address of the bit in BAM 40 that is to be used as a source of the value to be written into IOIM 25. If S is 0 or 1, the register into which S is normally loaded is not loaded.

N is a 1-bit field specifying the value of the increment to be automatically added to the current effective value of S prior to execution of this list entry. Where N=0, the source bit for this word of the output list will be taken from the same BAM address as the current source address. In typical practice, the first entry in the output list has N=0 so that the source operand is taken from the BAM location as specified by the S-field of the OUTPUT mode instruction. Subsequent list entries may have N=0 or N=1. The effect of subsequent entries with N=0 is to write the same BAM bit into more than one IOIM location to effect exactly parallel outputs. Where N=1, the effect is to sequence through BAM 40, starting at the initial source location, and transferring bits to IOIM 25 in the order found in BAM 40. The last output instruction leaves the contents of DAR 45 equal to the address of the last BAM access.

A is a 12-bit field specifying the destination address in IOIM 25 to which the BAM source bit is to be transferred. The contents of the BAM source bit are not altered by the transfer. The A-field gives the output list the effect of a map from BAM to IOIM.

T is a 2-bit field specifying the type of output according to the following code:

| T  | OPERATION                | EFFECT                    |
|----|--------------------------|---------------------------|
| 00 | combinatoric -( )-       | <A>←<BAM>                 |
| 01 | inverted combinatoric -(/)- | <A>←/<BAM>             |
| 10 | set latch -(R)-          | <A>←<A>*/<BAM>            |
| 11 | reset latch -(S)-        | <A>←/<A>*<BAM>            |

As alluded to above in connection with the description of the input instructions, the addressable space may be extended beyond the bounds of the 12-bit address field of the input instructions and output list. For those embodiments wherein such extension is possible, the mode (M) field is as follows:

| M      | OPERATION |
|--------|-----------|
| 00X000 | NOP       |
| 00X001 | OUTPUT    |

| M      | OPERATION              |
|--------|------------------------|
| 00X010 | EDGE DETECT            |
| 00X011 | OUTPUT                 |
| 000100 | EXTEND                 |
| 000101 | EXTEND and OUTPUT      |
| 000110 | EXTEND and EDGE DETECT |
| 000111 | EXTEND and OUTPUT      |
| 001100 | PAGE                   |
| 001101 | PAGE and OUTPUT        |
| 001110 | PAGE and EDGE DETECT   |
| 001111 | PAGE and OUTPUT        |

If the subsequent instruction is an input instruction, bit(6) of the extend instruction is taken as bit(12) of the address field (A) of the input instruction. The effect is to override the default IOIM page for the duration of the immediately following input instruction only, and extend the IOIM address field to 13 bits. If the following instruction is not an input instruction, the extend instruction acts as a NOP.

For the PAGE instructions, the IOIM page is set to the value of the single-bit parameter P which occupies bit(6) of the PAGE instruction. The page remains selected until changed by another page instruction. At power up the page is initialized to 0. The page instruction is the only interruptible multiword mode instruction. Therefore, the selected page value is considered to be part of the machine's state and is updated by NPCALL instructions which save and restore state.

Each of the NPCALL instructions and its parameter list have a bit allocation as follows:

```
       15 14 13 12 11 10 9 8 7 6 5 4 3 2 1 0
       0  0  1  X  X  X         S         0
List:              P1
                   P2
                   :
                   Pn
```

An NPCALL instruction signifies, in effect, a subroutine call to numeric processor 15. Control passes from BP 20 to NP 15, and resumes in BP 20 at the instruction immediately following the parameter list formed by the words immediately following the NPCALL instruction. The length of the list is implicit in the NPCALL.

S is a field of 8-9 bits specifying the unique name of the NP subprogram. The least significant 2 bits of the contents of what is pointed to by DAR 45 are prefixed to S to form a transfer vector into a table of subprogram entry addresses. As will be described below, BAM 40 is treated as if it were addressable as 4-bit nibbles, even though the actual hardware is not necessarily implemented as 4-bit memory. Therefore, <<DAR>> is always aligned on a nibble boundary and object code is always compatible. Where vectoring is not used by a subprogram, table entries are identical.

The parameters are 16-bit fields interpreted by the specific routine invoked by the NPCALL instructions. Any number of immediate parameters can be passed by the parameter list with indirection and indexing left to the interpretation.

There re two uses of NPCALL instructions. One is to gain access to the operating system subroutines such as I/O drivers, task schedulers, and the like. Such NPCALL instructions are inserted by the compiler and invisible to the user. The second use is as a "function box" in ladder or logigram languages. These re packaged subroutines that the system makes available to the user.

Solution Of Ladder Diagrams

Ladder language is the most common language in use, currently representing on the order of 80% of the worldwide market. It is a two-dimensional graphic language showing power flow from left to right across the screen, and represents Boolean variables corresponding to relay contacts (which may be normally open or normally closed). A relay contact may be edge detected in the sense that its corresponding Boolean variable is true for the first scan cycle following a change in state.

FIG. 3 shows an example of a ladder diagram to be solved. Power flow is imagined to occur from a left or power rail 50 to a right or ground rail 55 through a network comprising a generally rectangular array of input contacts designated I1-I9, the states of which determine the status of an output relay designated O1. In this particular example, input contacts I2 and I5 are normally closed contacts while the remaining input contacts are normally open. The points at which branching paths converge or diverge are called nodes, and are designated N2-N4 (N1 is reserved for the left rail).

Thus, in this example, power will flow from N1 to N2 if either: (a) I1 and I3 are energized to close the normally open contacts while I2 remains unenergized to leave the normally closed contacts closed; or (b) I6 and I7 are energized to close the normally open contacts. Power will flow from N2 to N3 if N4 is energized to close the normally open contact. Similarly, power will flow from N3 to N4 (and thus to output coil O1) if either: (a) I5 remains unenergized to leave the normally closed contact closed; or (b) I8 and I9 are both energized to close the normally open contacts.

A ladder diagram is compiled into an instruction stream that may include any or all of the following structure and input instructions:

| structure: | INIT |
|---|---|
| input: | AND-OR D |
| | AND T |

NPCALL and mode instructions are used for function boxes, outputs, and unusual cases.

The compiler must recognize the ladder structure which is characterized by the nodes (a node being a union of two circuits). A node becomes a destination value in BAM, with computation being done which continuously modifies the node value until all input circuits to the node have been taken into account.

The ladder of the worst possible complexities requires two instructions per contact: one input instruction to name the contact and account for its logical effect, and one structure instruction to define the node and branch structure adjacent to the contact. The structure instruction is executed first. Very few ladders require an average of two instructions per contact—1.1 or 1.2 instructions per contact is typical. Thus, the BP of the present invention is very efficient.

The BP's interpretation of the Ladder can be defined by translating structural elements to their object code.

The Ladder can start in one of three ways:

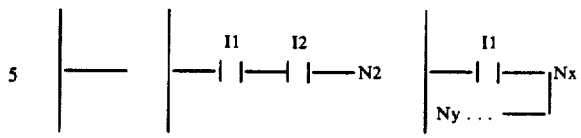

The left-most has the effect of extending the left rail toward the right, and no object code is compiled (i.e., null inputs require no code). The middle case is two inputs in series, whereupon the compiler generates code to do the following:

$$<T> \leftarrow S(1) \text{ by definition}$$

$$<T> \leftarrow <T> * I1$$

$$<2> \leftarrow <T> * I2$$

The right-most is a contact followed by a node, Nx, whereupon the compiler generates code to do the following:

$$<x> \leftarrow <1> * I1$$

$$<x> \leftarrow <x> + f<y>$$

where f<y> is some Boolean function of Node y and the contacts between Node x and Node y.

Some general compiling rules for ladder may be summarized as follows:

1. The evaluation of a node is started with an INIT structure with the destination address being the node being evaluated, and the source address being the node upstream whose effect must be accounted for. An exception is that if the node has already been partially evaluated, the destination address should be 0 since the INIT will then load T and N with <s> without destroying the already partially calculated node.
2. Series contacts are done with an AND T input instruction.
3. Series contacts are finished with an AND-OR D input instruction.
4. Another parallel group of series contacts is done repeating steps 2 and 3.
5. Only one contact (in series) is done with an AND-OR D input instruction.

Using the above rules, the ladder diagram of FIG. 3 is compiled into and solved by the following code.

| | INSTRUCTION | EFFECT |
|---|---|---|
| (str.) | INIT : 1,2 | S = 1, D = 2, <2>←0,(<S> = 1), T←<S>, N←<S> |
| (inp.) | AND T : I1 | T ← T * I1 |
| (inp.) | AND T : /I2 | T ← T * /I2 |
| (inp.) | AND-OR D : I3 | <2> ← <2> + T * I3, T ← N |
| (inp.) | AND T : I6 | T ← T * I6 |
| (inp.) | AND-OR D : I7 | <2> ← <2> + T * I7 |
| (str.) | INIT : 2,3 | S = 2 D = 3, <3>←0 T←<S>, N←<S> |
| (inp.) | AND-OR D : I4 | <3> ← <3> + T * I4 |
| (str.) | INIT : 3,4 | S = 3, D = 4, <4>←0 T←<S>, N←<S> |
| (inp.) | AND-OR D : /I5 | <4> ← <4> + T * /I5, T ← N |
| (inp.) | AND T : I8 | T ← T * I8 |
| (inp.) | AND-OR D : I9 | <4> ← <4> + T * I9 |

FIG. 4A shows a simple function box, namely a timer T15, which may be implemented by a subroutine call (NPCALL) to NP 15. Timer T15 has C (countdown or time) and E (enable) inputs and D (done) and R (running) outputs. Associated with timer T15 are a preset value and a timer register. The timer operates by counting down the timing register when the E and C inputs are true. When the E input is false, the timing register is forced to the preset value. The D output is true when the timer has counted its timing register down to zero. The R output is true when the timer register is non-zero and both C and E inputs are true, that is, while timer T15 is running.

Each timer present in the system has an associated 4-word sublist in a timer list within a common data segment in program memory 30. The first word of the sublist includes the most recent values of C, E, D, and R, and a field specifying the time base (10 milliseconds, 100 milliseconds, 1 second, or 1 minute) which is fixed at program time. The second word is the preset value. The third word is the timer register value. The fourth word is a link list pointer which links the sublists of all timers operating on the same time base that are running. The pointer is zero when the corresponding timer is not running.

System-wide timing is carried out by a system routine which is invoked by an interrupt every millisecond. The routine determines which time base is to be serviced, and operates on the linked list of timers operating on that time base. The routine decrements the timer register value in the sublist of each timer that is running on that time base. in the event that the register value reaches zero, the subroutine removes that sublist from the linked list by zeroing the pointer.

The actual timer operation is invoked by a call to a function box subroutine corresponding to the particular type of timer, with the subroutine parameter being the address of the sublist for the particular timer. This may occur once each scan cycle, or more often, depending on the program. Prior to calling the function box subroutine, BP 20 executes the code necessary to evaluate C and E and place them in BAM locations on a nibble boundary, that is, starting at a BAM location whose address is 0 (modulo 4). The subroutine call (NPCALL instruction) causes NP 15 to commence execution. The BAM locations counting the C and E values are communicated to NP 15 on system data bus 12, and the subroutine determines whether C or E has changed in a manner that dictates starting or stopping the timer. If so, the subroutine invokes a system routine that links or unlinks the sublist, as the case may be. The D and R outputs are evaluated, the valves of C, E, D, and R are updated in the sublist, the subroutine writes the outputs in the BAM locations previously occupied by the inputs, and control is passed back to BP 20.

For the particular example, assume that the C and E inputs are to be set up at nodes 8 and 9. The following code will implement the diagram in FIG. 4A.

| (str.) | INIT : 1,8 |
| (inp.) | AND D : I1 |
| (str.) | INIT : 1,9 |
| (inp.) | AND D : I2 |
| (npc.) | NPCALL TMR1 |
| (address of timer 15 sublist). | |

It is noted that the values in nodes 8 and 9 provide the actual operating values for the subroutine, but also allow one of four entry points, depending on these values, to be chosen.

FIG. 4B shows a function box for an up-down counter C10. Counter C10 includes U (up), D (down), P (preset), and R (reset) inputs, and D (done), E (underflow), and F (overflow) outputs. Associated with counter C10 are a preset value and a counter register (counter content).

Upcounting occurs when the value of U changes from zero to one. Downcounting occurs when the value of D changes from zero to one. The P input causes the counter register to assume the preset value; the R input causes the counter register to be set to zero. The F output is true if the counter is counted above 9999 (to zero); the E output is true if the counter is counted below zero (to 9999). The D output is true if the counter reaches its maximum value of 9999.

As in the case of the timer of FIG. 4A, counter C10 has a sublist in a counter list within the common data segment. However, the counter list is not linked as in the case of the timer list since the list need only be accessed when the counter function box subroutine is called.

SOLUTION OF LOGIGRAM DIAGRAMS

Logigram is a two-dimensional graphical language nearly identical to the logic schematic used by digital design engineers. FIG. 6 shows a logigram representation of the same system as shown in the ladder diagram of FIG. 3. In this case, series combinations of contacts are represented by AND gates having the corresponding variables as inputs, while the flow of alternate branches into a node is shown as an OR gate. It should be noted that there exist other logigram representations equivalent to that shown in FIG. 4.

A logigram diagram is compiled into an instruction stream that may include any or all of the following structure and input instructions:

| structure : | NOT |
| | AND |
| | OR |
| input : | AND D |
| | AND-OR D |

NPCALL and mode instructions are used for flip-flops, counters, timers, and the like.

The compiler uses the nodes as part of a structure, much like in ladder, except that the output of each "gate" is a node.

Some general compiling rules for logigram may be summarized as follows:

1. An inverter is implemented by using the NOT structure instruction with the source being the input node and the destination being the output node.

2. An AND gate is implemented using first a NOT structure instruction with the source being 0 and the destination being the output node. This loads T, N, and <D> (which is the gate output) with 1. An input which is another node is handled with an AND structure instruction with the source being the input node and the destination being the output node. An input from IOIM 25 is handled with an AND D input instruction which basically ANDs <D>, T (always 1), and I. The input for the input instruction may be complemented to save inverters.

3. An OR gate is implemented using first a NOT structure instruction with the source being 1 and the destination being the output node. This loads T and N with 1 and <D> (which is the gate output) with 0. An input which is another node is handled with an OR structure instruction with the source being the input node and the destination being the output node. An input from IOIM 25 is handled with an AND-OR D input instruction which OR's <D> with the AND of T (always 1) and I.

Thus, the logigram code is very efficient with the number of instructions per gate being only one more than the number of inputs. Inversion costs only one instruction, and inversion of inputs from IOIM 25 is free due to the complementation option (C-field) of the input instructions.

Using the above rules, the logigram diagram of FIG. 4 can be compiled and solved by the following code.

| | | |
|---|---|---|
| (str.) | NOT : 0,2 | |
| (inp.) | AND D : I1 | |
| (inp.) | AND D : /I2 | |
| (inp.) | AND D : I3 | |
| (str.) | NOT : 0,3 | |
| (inp.) | AND D : I6 | |
| (inp.) | AND D : I7 | |
| (str.) | NOT : 0,4 | |
| (inp.) | AND D : I8 | |
| (inp.) | AND D : I9 | |
| (str.) | NOT : 1,5 | |
| (str.) | OR : 2,5 | |
| (str.) | OR : 3,5 | |
| (str.) | NOT : 1,6 | |
| (inp.) | AND-OR D: /I5 | |
| (str.) | OR : 4,6 | |
| (str.) | NOT : 0,7 | |
| (str.) | AND : 5,7 | |
| (inp.) | AND D : I4 | |
| (str.) | AND : 6,7 | |

Circuit blocks such as timers, counters, and the like are implemented in the same way that corresponding function boxes are implemented in ladder language.

SOLUTION OF BOOLEAN EXPRESSIONS

Boolean language is a literal representation which takes the form of a character string of logical variables. For example, the Boolean representation of the systems illustrated in FIGS. 3 and 5 is as follows: O1=(I1*/I2-*I3+(I6*I7))*I4*(/I5+(I8*I9)) where '*' has precedence over '+'. To the extent that the values of interim combinations corresponding to the nodes of FIG. 3 are relevant (as for example if there are other branches) the Boolean expressions might look as follows:

N2=I1*/I2*I3+I6*I7

N3=N2*I4

N4=N3*(/I5+I8*I9)

O1=N4.

A Boolean expression is compiled into an instruction stream that may include any or all of the following structure or input instructions:

| | |
|---|---|
| structure : | NOT |
| | AND |
| | OR |
| input : | AND D |
| | AND-OR D |
| | STACK |

In the case of Boolean, the significance of the nodes is different. The BAM "nodes" are levels of parenthesis in a Boolean "stack". As each left parenthesis is encountered, a new (higher) node is used to compile the results of the Boolean function enclosed by this left parenthesis and its associated right parenthesis.

Some general rules for compiling Boolean expressions may be summarized as follows.

1. The evaluation of a Boolean function (or subfunction) is started with a NOT structure instruction. The loading of DAR 45 with the new D, and <D> with the complement of <S> is not relevant, but the loading of T and N with 1 is.

2. A STACK input instruction (which increments DAR 45 automatically) is used for each input that does not end with a right parenthesis. This ANDs the input with T (T always 1), stores the result in the BAM location pointed to by the incremented DAR, and then loads T with N (which was loaded with 1 by the first NOT structure instruction).

3. A left parenthesis is ended when the right parenthesis is reached. This is done with an AND or an OR structure instruction. They "unstack" the value which has been computed for the function within the parenthesis and AND or OR it with the value in the next lower stack position. To this end, S is set to the value of the stack before unstacking, and D to the next lower value of the stack. Thus, for example, AND:3,2 (S=3 and D=2) takes the value in BAM(3), loads DAR 45 with the new value D which is 2, ANDs the value in BAM(3) with the value in BAM(2), and then store the result in BAM(2).

4. Variables on the same "stack" level are combined with the AND D and AND-OR D input instructions.

Using these rules, the expression corresponding to the diagrams in FIGS. 3 and 4 may be compiled as follows:

| INSTRUCTION | | <DAR> | CONTENT OF BAM LOCATIONS <DAR>...2 |
|---|---|---|---|
| (str.) | NOT: | 0,2 | 2 | <1> |
| (inp.) | STACK: | I1 | 3 | I1 |
| (inp.) | AND D: | /I2 | 3 | /I2*I1 |
| (inp.) | AND D: | I3 | 3 | I3*/I2*I1 |
| (inp.) | STACK: | I6 | 4 | I6, I3*/I2*I1 |
| (inp.) | AND D: | I7 | 4 | I7*I6, I3*/I2*I1 |
| (str.) | OR: | 4,3 | 3 | I7*I6+I3*/I2*I1 |
| (inp.) | AND D: | I4 | 3 | I4*(I7*I6+I3*/I2*I1) |
| (inp.) | STACK: | /I5 | 4 | /I5,I4*(I7*I6+I3*/I2*I1) |
| (inp.) | STACK: | I8 | 5 | I8,/I5,I4*(I7*I6+I3*/I2*I1) |
| (inp.) | AND D: | I9 | 5 | I9*I8,/I5,I4*(I7*I6+I3*/I2*I1) |
| (str.) | OR: | 5,4 | 4 | I9*I8+/I5,I4*(I7*I6+I3*/I2*I1) |

| INSTRUCTION | | <DAR> | CONTENT OF BAM LOCATIONS <DAR>...2 |
|---|---|---|---|
| (str.) | AND: | 4,3 | 3 | (I9*I8+/I5)*I4*(I7*I6+ (I3*/I2*I1) |
| (mode) | OUTPUT: | 3 | 3 | |

Overview of Preferred Hardware Implementation

FIGS. 6-14 are simplified circuit schematics and timing diagrams of PC 10 showing a preferred embodiment of NP 15, sequencer 17, BP 20, and the associated memories and control circuits. FIGS. 15-17 are complete circuit schematics showing additional details of various control circuits. A complete set of circuit schematics is provided in a microfiche appendix filed with this application. These include seventeen sheets relating to the processor main circuit board and four sheets relating to the program memory auxiliary circuit board.

The simplified schematics incorporate the following drawing conventions. In general, signals enter circuit elements or blocks on the left or top and exit on the right or bottom. A rectangular shape is used to indicate a memory device such as a flip-flop, latch, or register; a box with rounded corners is used to indicate a device without memory elements such as a decoder, multiplexer, or parity tree. So that the functionality and operation may be better understood, all signals are drawn in the high true sense, even though many signals are low true in the actual implementation. Therefore, a bubble on an input device or a minus sign before a signal mnemonic indicates logical negation of the state of the signal, not accommodation of a low true signal. Circuit elements or blocks are referenced with one or more designators comprising the letter "U" followed by a number. These designators correspond to the designators used on the circuit schematics in the microfiche appendix. Part types and cross-references to the sheets in the microfiche appendix are set forth in Table 2 at the end of this specification.

Although NP 15, sequencer 17, and BP 20 operate in exclusive fashion so that only one processor has control at a given time, all three have their basic timing derived from a system clock signal, designated generically CLK or GCLK, having a cycle time of approximately 135 nanoseconds. The clock signal is a series of pulses characterized by a leading edge at the beginning of the cycle and a trailing edge approximately two-thirds through the cycle.

Numeric Processor Hardware and Timing

FIG. 6 is a simplified circuit schematic showing the configuration of NP 15, address latch 31, IP 32, program memory 30, and I/O interface 11.

NP 15 is preferably implemented with a pair of microprocessor chips U4 and U7. Microprocessor U4 carries out numerical computations and oversees memory and I/O functions (in concert with sequencer 17) while microprocessor U7 operates as a console communications processor which carries out timing functions and provides a terminal interface. Microprocessors U4 and U7 are coupled to a multiplexed address/data bus AD(0-15) with an additional portion A(16-19) expanded for high-order address bits only. The AD bus is a two-phase bus which carries address information in the first phase and data information in the second phase. Microprocessors U4 and U7 operate in exclusive fashion wherein the microprocessor that is not executing places its bus outputs in a high impedance state while the other microprocessor executes.

Address latch 31 operates to demultiplex the address information from the AD bus and comprises transparent latches U6, U8, and U18. The latch inputs are coupled to the AD bus and the outputs to an address bus ADDR(1-16). ADDR(1-4) are communicated to sequencer control circuitry that includes a counter U90 and a multiplexer U100. ADDR(1-4) are communicated to a first set of inputs of multiplexer U100, and through counter U90 to a second set of inputs of multiplexer U100. The multiplexer outputs ADDRSQ(1-4) provide the low-order four bits while ADDR(5-16) provide the high-order twelve bits used to address program memory 30.

IP 32 is an incrementable, parallel loadable register that includes a counter (U87, U88, U98, U99) and a buffer (U89,U107). The counter has inputs coupled to system data bus 12 (designated DATABUS(0-15)) and outputs that drive the ADDR lines through the buffer. In operation, NP 15 loads IP 32 prior to passing control to BP 20, whereupon IP 32 serves as the instruction pointer for BP 20. Thus, when control passes, IP 32 points into program memory 30 so that instructions may be fetched and made accessible to BP 20. It is noted the data for BP 20 are stored in IOIM 25 and BAM 40, not in program memory 30.

Program memory 30 includes RAM (U150,U151), ROM (U152,U153,U154,U155), and cartridge elements whose data outputs (and inputs as appropriate) are coupled to a local memory bus MEMBUS(0-15) which is coupled to system data bus 12 through a bidirectional bus transceiver (U115, U122). Instructions and data operands are gated through receiver (U115, U122) in strobed fashion. The use of such a local memory bus is necessitated by the low electrical drivability of the memory elements.

System data bus 12 ties the functional aspects of the programmable controller together and provides a pathway for communication between them. The multiplexed AD bus is coupled to system data bus 12 through a bidirectional bus transceiver (U3, U16, U17) which gates information in a strobed fashion. This information includes instructions fetched from main memory for microprocessors U4 and U7, data operands from main memory, and other operands from IOIM 25, BAM 40, sequencer 17, and status registers to be described below.

As discussed above, I/O interface 11 provides for data transfer between remote I/O modules and IOIM 25. Such data transfer, which must occur each scan cycle, is carried out over an 8-bit parallel bus PARBUS (0-7) and a 1-bit (plus associated frame and clock lines) serial bus SERBUS. The parallel bus is interfaced to DATABUS(0-7) via receiver circuitry (U111,U114) and transmitter circuitry (U113,U121,U112,U120).

Serial bus SERBUS is interfaced through a shift register U129. The "left" input to shift register U129 is a bit IOIM0 from IOIM 25 while the "right" output is communicated through a driver U143 to the serial bus. The "right" input to shift register U129 is from serial bus SERBUS through a receiver U142 while the "left" output is a bit SHRG0 which is transmitted to IOIM 25. Thus, serial data can be shifted in either direction between the serial bus and IOIM 25. Shift register U129 can also transfer eight bits in parallel to or from system data bus 12 to communicate with the parallel bus or NP 15.

In the particular hardware implementation described above, microprocessor U4 operates according to a 4-cycle regime with successive clock cycles being designated T1, T2, T3, and T4. Microprocessor U4 places address information on the AD bus and the address is latched into address latch 31 during T1. Microprocessor U4 asserts the READ signal during T2, and the addressed circuit determines whether it is ready to place its data on the system data bus. To the extent that the addressed circuit is ready, it places the data operand on the bus, and the data operand is strobed onto the AD bus at the beginning of T4. As will be discussed below, wait states (designated TW) are inserted between T3 and T4 in the event that the addressed circuit is not ready. It is during such wait states that sequencer 17 and BP 20 may operate.

FIG. 7 is a timing diagram illustrating the basic timing for a circumstances where there is one wait state. The pertinent signals are designated ALE86, T1SH, T2, T2T3TW, ENAMEM, READY86, and RDYSYNC.

ALE86 (address latch enable) is asserted by microprocessor U4 during T1, and has the effect of allowing address latch 31 to take the address information off the multiplexed AD bus.

T1SH is a signal that is delayed relative to the T1 cycle by less than one clock cycle. T1SH is asserted at the trailing edge within T1 (as validated by ALE86 being asserted), and is withdrawn at the trailing edge within T2 (as validated by ALE86 being withdrawn).

T2 is asserted at the leading edge of the clock signal (as validated by T1SH being asserted) and is withdrawn at the next leading edge of the clock signal (as validated by T1SH being withdrawn). This signal thus defines the T2 cycle during which the addressed circuit determines whether it is ready or not.

T2T3TW is a strobe signal used to gate the memories' outputs onto the various buses in the system. It is used to validate the BP phases during BP operation and the sequencer output word from program memory 30 during sequencer operation. T2T3TW is asserted at the leading edge of T2 (as validated by T1SH being asserted) and is withdrawn at the leading edge of the first clock pulse occurring with RDYSYNC asserted. Thus T2T3TW is asserted during T2, T3, and any wait states, and is withdrawn at the leading edge of the T4 clock pulse.

ENAMEM is asserted during the T2, T3, any wait states, and T4. ENAMEM is withdrawn at the leading edge of the first clock pulse occurring after T2T3TW has been withdrawn, that is, at the end of T4.

READY86 is set up by the addressed circuit, if such addressed circuit is ready, and is asserted at the end of T3.

RDYSYNC is the signal that injects wait states into the memory accesses of microprocessor U4. RDYSYNC is asserted at the trailing edge within TW (as validated by READY86), and validates the withdrawal of T2T3TW at the leading edge of the next clock pulse. This defines T4 and allows the data operand to be sampled.

Sequencer Hardware and Timing

FIG. 8 is a simplified schematic of sequencer 17, which operates in conjunction with NP 15. As previously discussed, NP 15 and BP 20 operate in an exclusive fashion so that both are never executing instructions at the same time.

Sequencer 17 is invoked by microprocessor U4, and operates to fulfill two main functions. The first function is providing a multiplicity of control signals for initializing BP 20, loading its registers, reading its registers, modifying its status, and otherwise manipulating its various control aspects. The second function is coupling NP 15 to the I/O subsystem wherein data are communicated between the I/O modules and system data bus 12 (itself coupled to IOIM 25). In this latter sense, sequencer 17 may be viewed as an auxiliary I/O processor which is invoked by NP 15 in order to perform I/O functions with respect to which the instruction set of microprocessor U4 is not well-suited. A number of microcoded sequences are stored in the ROM elements within program memory 30 for this purpose.

Broadly, sequencer 17 includes counter U90 (shown in FIG. 6 and mentioned above), a register (U116, U123), decoding circuitry (U32, U91), and timing control circuitry (U79, U80, U81, U82).

The four low-order bits of the ADDR bus are communicated to counter U90, the outputs of which may be selected at multiplexer U100 to provide the address. When microprocessor U4 is in the I/O mode, the outputs of counter U90 are selected at multiplexer U100 to provide the four low-order address bits. Incrementing counter 90 then causes microcoded sequences of up to sixteen steps to be placed on MEMBUS(0-15).

The sequencer instructions are loaded from MEMBUS(0-15) into register (U116,U123), one bit of which (DECODE) is communicated to decoding circuitry (U32,U91) to invoke a secondary decoding regime that allows more than sixteen output bits to be extracted. Decoding circuitry (U32,U91), when invoked by the DECODE bit from register (U116,U123), decodes a number of bits from the address bus to provide auxiliary control signals for reading status ports and BAM 40, and writing into IP 32, T-register 42, and N-register 43.

Sequencer 17 has associated control circuitry which suppresses READY86 when microprocessor U4 makes an access in I/O space. Each I/O command in the instruction stream being executed by microprocessor U4 corresponds to a sequence of operations to be carried out by sequencer 17. The I/O address corresponds to an address in that portion of program memory 30 that can be addressed by a 16-bit (rather than 20-bit) address, and the corresponding sequence of sequencer instructions is stored starting at this address. On execution of the I/O command, the M/-IO bit is set, which has the effect of holding the READY input to microprocessor U4 false. Execution of the sequencer program continues until an instruction containing END or SHORT flag appears.

Each sequencer instruction is loaded from local memory bus MEMBUS into register (U116,U123), and execution, which occurs upon the incrementing of counter U90, occupies three system clock cycles, designated SEQPH1, SEQPH2, and SEQPH3. Register (U116,U123) is loaded at the end of SEQPH3 and is cleared by the withdrawal of T2T3TW. During execution, buffer (U115,U122) between MEMBUS and system data bus 12 is put at high impedance so that sequencer 17 can use system data bus 12 for communicating with microprocessor U4.

The circuitry for effecting the 3-phase operation includes a cascaded flip-flop chain U80 with associated gates U79, U81, and U82. Flip-flop chain U80 is cleared by the withdrawal of T2T3TW and rests with SEQPH2 asserted.

Sequencer instructions are microcoded with the bit allocation as follows:

| 15 | ALLPH | Control shift register clocks |
|----|-------|-------------------------------|
| 14 | /END | Last sequencer instruction |
| 13 | WRIOIMFRSQ | Write to IOIM |
| 12 | MUXSQ1 | |
| | | Multiplexer select |
| 11 | MUXSQ0 | |
| 10 | SHRLEFT | |
| | | Shift register commands |
| 9 | SHRIGHT | |
| 8 | RDSHRG | Read shift register |
| 7 | IOOUT | Output exchange on a bus |
| 6 | STB | Transmit strobe signal |
| 5 | SCLK/EXCHPARIO | |
| 4 | CHECKACK/STB | |
| 3 | NOWDGACK | Eliminate hardware watchdog |
| 2 | DECOD | Special function |
| 1 | /SHORT | Last instruction (short) |
| 0 | LDRIMSQ | Load RIM register |

/END indicates the last instruction of a sequencer program. The bit is complemented in the sequencer instruction because when the sequencer stops, the register holding the instruction is cleared and it is necessary in this state that the signal be logically true, even though electrically low.

/SHORT indicates the last instruction of a sequencer program, but it modifies the last instruction's execution so as to occur in two cycles rather than three. Microprocessor thus U4 restarts one clock period sooner than with an END instruction.

RDSHRG specifies reading shift register U129. The bit has two different meanings depending on whether microprocessor U4 has done an IN or an OUT instruction when starting the sequencer program. If microprocessor U4 executed an IN, RDSHRG causes the eight bits of shift register U129 to be enabled onto DATABUS(0–7) during the three (or two) cycles of the instruction. If microprocessor U4 executed an OUT and RDSHRG is true, the /RD signal controls whether shift register U129 can put its data onto the bus.

SHRIGHT and SHRLEFT control the loading and the shifting of shift register U129. When both are true, the shift register is loaded from system data bus 12; when one bit is true, the shift register is shifted in the appropriate direction.

WRIOIMFRSQ controls writing into IOIM 25. The bit allows four bits to be written into IOIM 25 during the SEQPH2 and SEQPH3 cycles, with the origin of the bits to be written being selected by MUXSQ0.

MUXSQ0 is used at the select input of multiplexer U73 to select the source of the bits incoming to the IOIM memory array.

ALLPH controls the number of loadings and shiftings of shift register U129 in an instruction. If ALLPH is true, the shift register is loaded or shifted at the end of each clock time (three times unless the SHORT bit is true in which case it is twice). If ALLPH is false, the shift register is loaded or shifted only at the end of the SEQPH3 cycle (not at all if SHORT is true).

IOOUT indicates the type of exchange, input or output, on the parallel or serial bus. True indicates output.

In the hardware, IOOUT also controls the direction of the data drivers and enables all the control bits except STB onto the parallel bus. It also controls the direction of the data bits onto the serial bus. These signals are enabled onto their respective bus line or lines during the entire instruction. The bit is ended with the FRAME bit to distinguish between the parallel and the serial bus.

SCLK/EXCHPARIO, STB, CHECK ACK/STB, and NOWDGACK control various aspects of the parallel and serial buses for the I/O subsystem and will not be described further.

DECOD causes the execution of a variety of special functions which include reading and writing the following registers:

| Read: | T-register 42, |
|-------|----------------|
| | N-register 43, |
| | DAR 45, |
| | IP 32, |
| | BAM 40, |
| | RIM register U76 (to be discussed below), |
| | processor status, and |
| | memory extension status. |
| Write: | T-register 42, |
| | N-register 43, |
| | DAR 45, |
| | IP 32, |
| | I/O address register, |
| | reset the status flip-flops, and |
| | interrupt microprocessor U7. |

The particular special function done depends on the I/O address, and thereby places a constraint as to where in address space the sequencer instructions with the decode bit are placed.

FIG. 9 is a timing diagram illustrating the passage of control from NP 15 to sequencer 17, the operation of sequencer 17, and the passage of control to NP 15. The pertinent signals are SEQPH1, SEQPH2, SEQPH3, SQRQWAIT, and READY86.

SEQPH1, SEQPH2, and SEQPH3 are the sequencer phase signals generated by flip-flop chain U80. SQRQWAIT is one of the signals that controls the setting up of READY86 which validates RDYSYNC, the signal that injects wait states into the operation of microprocessor U4. SQRQWAIT is asserted when T2T3TW and IO are asserted (i.e., during the T2 cycle of an I/O command), and causes READY86 to go false at the trailing edge within T2. SQRQWAIT goes false at the end of SEQPH1 of an END instruction, or upon the occurrence of a SHORT instruction, whereupon READY86 is asserted at the trailing edge within SEQPH2.

Boolean Processor Hardware and Timing

FIGS. 10–13 are simplified circuit schematics illustrating the various subsystems within BF 20 and its associated memory elements. As discussed above, at least the high-order four bits of a program instruction specify an opcode, while the low-order twelve bits may be operands. For structure instructions the operands are two 6-bit fields that provide source and destination addresses in BAM 40; for input instructions the operand is a 12-bit field to address IOIM 25. Although the details of the instruction execution will be discussed below, it is noted at this point that each instruction of BP 20 executes in three phases, each of which is a 135-nanosecond system clock cycle in duration. These three phases are designated BPPH1, BPPH2, and BPPH3. The portions of the instructions that are executed during the different phases are set forth in Table 3.

FIG. 10 is a simplified circuit schematic of PIPE register 33. As mentioned above, the instructions from system data bus 12 are not communicated directly to BP 20 and its memory elements, but rather are communicated through PIPE register 33. The PIPE register circuitry includes a counter U59 and a latch (U45, U60). The register output lines are designated PIPE(0-15), the four high-order bits of which provide the opcode and the twelve low-order bits of which are used to point to IOIM 25 and BAM 40. Counter U59 may be incremented under control of sequencer 17 to allow rapid transfers between IOIM 25 and system data bus 12 or shift register U129.

During operation of BP 20, each BP instruction is fetched from program memory 30, loaded into PIPE register 33, and held static through its execution. This allows a degree of pipelining between program memory 30 and BP 20 since the next instruction can be generated while the current instruction in PIPE register 33 is being executed. Thus, the operation of the program memory subsystem is one instruction ahead of the operation of BP 20. At the end of BPPH3, the next instruction is loaded into PIPE register 33, BP 20 begins to execute the just-loaded instruction, and IP 32 is incremented so that the memory system may begin to generate the next instruction. Associated with the PIPE register is the EDGE bit ("EDGE flip-flop") which is set for an EDGE mode instruction so that edge resolution may be taken into account for the next instruction.

FIG. 11 is a simplified circuit schematic of the IOIM subsystem, generally referred to as IOIM 25. In broad terms, the IOIM subsystem, when given a 12-bit address on PIPE(0-11), either generates a data bit for combinatoric logic 35 of BP 20 or accepts a data bit from it.

The actual memory is implemented as an array of memory elements U62, U63, U64, and U65, each of which contains 4K bits. The four memory elements are addressed in parallel so that each of the IOIM nodes is represented by four bits, called D, H, F, and P, having the following significance.

The D (data) bit represents the logical state of the particular IOIM location.

The H (history) bit represents the value of the D bit prior to the last time the D bit was written. Thus, the H bit provides one level of history and, in conjunction with the D bit, is used for edge detection.

The F (force) bit is initialized, set, and cleared only by NP 15 and, when set, prevents the overwriting of the corresponding history and data bits. The write suppression is carried out by hardware so that any attempt to alter a write-protected location in IOIM 25 is suppressed, but normal execution of the BP instruction stream continues.

The P (parity) bit is set to reflect odd parity of the D, H, F, and P bits to allow for error detection within IOIM 25. The parity bit is generated at an XOR gate tree U75 upon writing into an IOIM location, and is checked at another XOR gate tree U77 each time an IOIM location is read. Parity checking is transparent to the operation of BP 20 until an error occurs. Detection of an error in the IOIM parity generates a signal ERR-PTYIOIM which suppresses further writing into IOIM and causes an interrupt to microprocessor U4 in NP 15. Execution of BP 20 then stops and NP 15 assumes control.

The D, H, F, and P outputs from the IOIM memory array are communicated to a register U76, called the RIM register, having outputs designated RIMD, RIMH, RIMF, and RIMP. The D, H, and F inputs to the IOIM's memory array are provided at the respective outputs of an input multiplexer U73 which allows IOIM 25 to be loaded from system data bus 12 when sequencer 17 so dictates. Otherwise, RIMF is written into the F bit, RIMD is written into the H bit, and the output from BP 20, designated OUTBITBP, is written into the D bit. RIMH and RIMD are communicated to combinatoric logic 35. A multiplexer U56 allows the D bit to be selected from OUTBITBP or from the "left" output SHRG0 of shift register U129.

The operation during reading and writing may be outlined as follows. In phase 1, the IOIM memory chips are addressed by PIPE(0-11) and the D, H, F, and P operands appear at the outputs of the IOIM memory array. At the trailing edge of BPPH1, the four bits are loaded into RIM register U76, and parity tree U77 detects correct or incorrect parity. At the beginning of phase 2, the two bits which are of significance to the BP 20, namely RIMD and RIMH, are delivered to combinatoric logic 35 so that at the entry to phase 2, BP 20 has the input data bit (and any necessary edge information).

FIG. 12 is a simplified circuit schematic of the BAM subsystem, generally referred to as BAM 40. In a broad sense, the BAM subsystem may be visualized as a 64-bit array which either provides a bit (BITBAM) to combinatoric logic 35 or accepts a bit (NEWBIT) from logic 35. However, the actual implementation utilizes a 16×4-bit memory element U70. In order to provide single-bit addressing, the four high-order bits of address information are communicated to the address inputs of memory element U70, while the two low-order bits are communicated to the select inputs of an input multiplexer (U86,U97) and an output multiplexer U85. The four output bits BAM(0-3) from memory element U70 are wrapped around to the respective first inputs of a multiplexed holding register 71, the respective second inputs of which are coupled to system data bus 12. Output multiplexer 85 provides a straightforward 4-to-1 selection. Input multiplexer (U86,U97) provides four 4-to-1 selectors, each of which receives NEWBIT at a different one of its inputs and receives the corresponding output bit from holding register U71 at the other three of its inputs. Since the outputs of holding register U71 (designated INBAM(0-3)) reflect the current state of BAM as addressed, the injection of NEWBIT into different single inputs of the input multiplexer allows a single bit of the four bits from holding register 71 to be updated.

While the four BAM bits (prior to selection at multiplexer U85) may be placed on system data bus 12 by sequencer 17 for access by NP 15, the two low-order bits 0 and 1 (modulo 4) are made available directly to the AD bus during BP mode through a buffer (transceiver) U5 to allow four-way NPCALL vectoring.

As discussed above, the actual 6-bit address for BAM 40 is provided first by the source bit (S) field (PIPE(0-5)) from a structure instruction and then from DAR 45. Selection occurs at an address multiplexer (U57, U58). DAR 45 is implemented as a pair of 4-bit counters U42 and U43 with two of the output bits being unused.

FIG. 13 is a simplified circuit schematic of the circuitry that implements opcode decoder 34, combinatoric logic 35, T-register 42, and N-register 43. Generally, most of the circuitry is implemented as a pair of programmable array logic ("PAL") devices U46 and U47. The input and output variables and the logical relationships among them are set forth in Tables 4A-B for PAL U46 and 5A-B for PAL U47. PAL U46 has no memory storage or registers on board, and serves only to decode various aspects of the state of BP 20 to provide control signals for the BP system. PAL U47 includes the logical tree to implement the Boolean functions of BP 20 and the flip-flops to implement T-register 42 and N-register 43. The input to PAL U47 include opcode information, BITBAM, a signal (D=0or1), and a signal (T*I) which represents the logical combination of the input bit from IOIM 25 with T-register 42.

PAL U47 also includes a counter which generates a pair of signals BP0 and BP1 which are encoded in Grey code to establish basic timing for the execution of the instructions. BP0 and BP1 are communicated to a demultiplexer U53 which generates the basic timing signals BPPH1, BPPH2, and BPPH3 as well as a signal INCRIP for incrementing IP 32.

The signals RIMD and RIMH from IOIM 25 are combined with the state of T-register 42, taking into account possible complementation of the input variable as specified by the C field (PIPE14) of the input instruction and possible edge resolution (EDGE bit set). The equation of the input (I) bit read from IOIM 25 is I = −EDGE*(−PIPE14*RIMD+PIPE14*−RIM-
D)+EDGE*(−PIPE14*−RIMH*RIMD-
+PIPE14*RIMH*−RIMD).

This is implemented with an 8:1 multiplexer U48 that receives RIMH, PIPE(14), and −EDGE at its select inputs; RIMD at the 0, 4, and 5 data inputs; −RIMD at the 3, 6, and 7 data inputs; and zero at the 1 and 2 data inputs. The combination with T is taken by having T enable the multiplexer chip.

FIG. 14 is a timing diagram illustrating the passage of control from NP 15 to BP 20, the operation of BP 20, and the passage of control to NP 15. The signals relevant to the passage of control are ARMBP, RTNTONP, NPMODE, BPMODE, NEXECBP, and READY86. The signals relevant to BP operation are BP0, BP1, BPPHH1, BPPH2, BPPH3, and INCRIP.

Except upon initialization, the passage of control from NP 15 may be viewed as the return from a subroutine call (NPCALL). The special instruction used to effect this is a memory instruction with an operand located in a particular address range (4000H-7FFFH), designated DONE. ARMBP is asserted during T2 when the address decoding circuitry determines that a memory instruction seeks to address a location in the DONE range.

RTNTONP is an output from PAL U46 and is asserted during the first phase of an NPCALL instruction.

NPMODE and BPMODE are a pair of complementary signals used to control a number of functions. BPMODE is asserted at the beginning of T3 when ARMBP has been asserted. NPMODE is asserted at the beginning of the second phase of an NPCALL instruction. BPMODE allows the overall operation of BP 20 including the operation of PAL's U46 and U47. When BPMODE is asserted, IP 32 drives ADDR (1-16); when NPMODE is asserted, address latch 31 drives ADDR (1-16).

Following the assertion of BPMODE, READY86 is withdrawn so that wait states are injected. NEXECBP is held true during the first three wait state cycles to suppress BP operation. This allows the instruction pointed to by instruction pointer 32 to be accessed and loaded into PIPE register 33. This instruction can then be executed by BP 20 during the next three cycles while the next instruction is fetched.

During BP operation NP 15 awaits a memory operand. During the BPPH3 phase of all BP instructions, the hardware provides an address at the input of address latch 31. This address is loaded into the address latch at the end of BPPH3 and, if the BP instruction is an NPCALL, the address provides the awaited operand.

BP0 and BP1 are the basic BP timing signals. Their decode provides the phases BPPH1, BPPH2, and BPPH3 and are in a gray code in order to avoid the risk of spurious transients at the input of decoder U53.

Additional Memory and Circuitry Details

Table 6A is a memory map of program memory 30 which is shared by NP 15, sequencer 17, and BP 20. As discussed above, program memory 30 includes system ROM elements containing programs for sequencer 17 and system information for NP 15, RAM elements containing user programs and certain system information for NP 15 and possibly cartridge elements for user programs. As discussed above, the user programs are executed by NP 15 and BP 20. Table 6B is an expanded map of the system RAM. Table 6C is an expanded map of the system ROM.

Although the total amount of actual memory is not such as to require a 20-bit address, the use of a 20-bit address with various foldbacks has the advantage of satisfying various software requirements and other similar constraints. This is accomplished by having the address decoding circuitry ignore certain address bits, thereby rendering the memory elements accessible at a number of different addresses. Addressing into the foldback areas below 80000H allows bad parity to be written for debugging purposes.

The system ROM code is centered around 80000H to make the code below 80000H contiguous with that above. For example, the interrupt vector table is addressed at 80000H while the code below it is at 7C000H (hardware reset vector at 7FFF0H). If the interrupt vector table started at 00000, the code below it would have to start at FC000H, and the assembler would not allow near jumps from the latter to the former. However, the address decoding hardware ignores the high order address bit, whereupon the code above FC000H can be addressed at 7C000H and the code above 00000 can be addressed at 80000H.

Similarly, the onboard RAM is accessible with six different addresses. For example, the user program is stored in the upper part of the system RAM (which is the part left over after the system has taken all it needs from the lower part). However, to make the user address space in RAM contiguous with the first user cartridge address space, which starts at address A0000H, the decoding circuitry ignores the seventeenth bit, thereby allowing the system RAM starting at 8C000H to be addressable also at 9C000H for user programs. Also, the range BC000H-BFFFFH is mapped by hardware to access system RAM starting at 8C000H.

FIGS. 15-17 are circuit schematics illustrating additional features relating to the controls for the co-processing architecture of the present invention. The circuitry of these figures is also shown in the microfiche appendix and portions are shown in the simplified schematics described above. The same reference numerals and designators are used.

FIG. 15 shows microprocessor U4, address latch 32, and buffer (U89,U107) between IP 32 and the ADDR bus. Buffer (U89,U107) and address latch 31, as discussed above, determine the source of the signals that are put onto the ADDR bus. In effect, when NPMODE is asserted, address latch 31 drives the ADDR lines; when NPMODE is withdrawn (BPMODE asserted), IP 32 drives the ADDR lines. NPMODE is communicated through a gate U21 which provides a signal ENAIP which is high when NPMODE is low (false) or when other signals specifying a read from IP 32 are asserted. ENAIP is communicated to the enable terminal of address latch elements U6 and U18, and disables the outputs when asserted. Latch U8 is always enabled. ENAIP is inverted at an inverter U10, the output of which is used to gate buffer (U89, U107). When ENAIP is asserted, buffer (U9,U107) is enabled to drive the ADDR lines.

FIG. 16 shows the circuitry for controlling the READY86, RDYSYNC, T2T3TW, and ENAMEM lines discussed above with reference to the timing diagrams of FIGS. 7 and 14. READY86 is provided at the complementary output of a flip-flop U49, the input of which is controlled by a gate U36. The gate inputs receive the various signals (including -SQRQWAIT and NPMODE) specifying whether wait states are required.

FIG. 17 shows the address decoding circuitry and the circuitry for determining the state of the BPMODE and NPMODE signals. NPMODE and BPMODE are the complementary outputs of a JK flip-flop U22, the J and K inputs which are the signals RTNTONP and ARMBP. As discussed above, PAL U46 in BP 20 asserts RTNTONP when an NPCALL instruction is encountered. This causes NPMODE to go high and BPMODE to go low at the next clock edge. ARMBP is asserted in response to a particular combination of address bits at the inputs to a decoder U31. This occurs when microprocessor U4 specifies a memory access to an address in the DONE range (84000H-87FFFH).

The address decoding circuitry receives a number of the high order address bits at its inputs, and operates to select the appropriate memory elements in program memory 30. The low order thirteen or fourteen bits are decoded by the memory elements themselves. The foldback of the range above 80000H to the range starting at 00000 occurs because the circuitry ignores the high order bit of the 20-bit address.

It is noted that addresses in the DONE range do not actually map into physical memory elements. Rather, as discussed above, the address decoding circuitry senses an address operand in the DONE range and cooperates with the other control circuitry to suspend operation of microprocessor U4 and start BP 20. Microprocessor U4 is left in a state part way through the instruction waiting for the addressed memory to return a target address. When the NPCALL instruction is encountered by BP 20, the control circuitry combines the S-field of the NPCALL instruction with the two BAM bits containing the NPCALL operands to construct a pointer into the vector table in system ROM (starting at address 83000H). The content of the pointed-to location is returned to microprocessor U4 which is then allowed to complete the suspended operation. Since, in the preferred embodiment, the instruction is a jump indirect, completion of the instruction causes the NP to commence execution at the proper location.

Both control-passage situations (NP to BP and return, and NP to sequencer and return) use the READY bus synchronization facility of microprocessor U4. However, the particular advantages, and hence the reasons for selecting the method over other possibilities, are somewhat different for each of the two situations.

In the first case (NP/BP), this method allows the most rapid execution of vectored control transfers from BP 20 to NP 15 and provides an inherent and necessary level of indirection between the call-specific field of the BP's NPCALL instruction and the target address of the NP's indirect jump. A further benefit of this indirection characteristic is the ability to include run-time state information (subroutine parameters) in the vector process. Thus, the NP does not have to engage in time-consuming interrogation of I/O ports or the like to obtain the BP state information.

In the second case (NP/sequencer), this method provides an economical way to pass control and information, although in this instance, the passage of information is from NP 15 rather than to NP 15. Because the use of READY-synchronization has the effect of holding the NP address and data output buses static for the duration of the sequencer operation, a cost-free channel for control of sequencer 17 is available. While an identical functionality might have been constructed by use of outboard control registers, the cost and complexity of such an implementation would be greater, without additional benefit.

A further benefit of the READY-synchronization method was alluded to above. Because the method entails a temporary suspension of ongoing NP activity, the method of "return" is implicit to the nature of the control passage invocation: to reassert the "ready" state (READY86) is to effect the return operation. Further, no start-up latency is introduced by this method, as would be the case if NP operation were terminated by various other commonly used techniques such as interrupt trapping. In the case of return from BP 20, NP operation resumes at the correct subroutine entry point. In the case of return from sequencer 17, NP operation resumes in-line as if the sequencer had executed an NP subroutine.

A significant benefit of the preferred implementation of the invention is the almost complete absence of miscellaneous support circuitry usually associated with designs of this nature. In the case of the NPCALL function, the principal support device is the portion of LSI memory in which the vector indirection information is stored. This table resides in the system ROM devices, occupying several kilobytes. In the case of the sequencer, the principal complexity resides in the portion of memory in which the sequencer programs are stored, also a small portion of the system memory. Thus, these two functions offer a high degree of function complexity without sacrificing speed of execution or significantly increasing the parts count or dissipation.

Conclusion

In summary it can be seen that the present invention provides a co-processing architecture that is especially well-suited to the needs of programmable controllers. Specialized processors dedicated to the various aspects of the overall system operation optimize the performance of each function. The passage of control from one processor to the other is accomplished very rapidly while requiring a minimum amount of additional hardware. The result is a system that is inexpensive and reliable.

While the above is full description of the preferred embodiment, various modifications, alternate constructions, and equivalents may be used without departing from the spirit of the invention. For example, while the disclosed I/O processor is a sequencer, the I/O processor could also be implemented as a microprocessor tailored to the I/O function. Indeed, the I/O processor's activities could be narrowed to serial I/O functions while having parallel I/O done by the numeric processor. However, in such a case, some benefits of specialization may be lost in favor of other considerations. Additionally, it is possible to implement the Boolean processor's working memories (IOIM 15 and BAM 40) as part of the LSI store that defines program memory 30.

Therefore, the above description and illustrations should not be taken as limiting the scope of the invention which is defined by the appended claims.

TABLE 1

| Abbreviations Used in Specification | |
|---|---|
| BAM | Binary Accumulator Memory |
| BCP | Best Case Program |
| BP | Boolean Processor |
| DAR | Destination Address Register |
| IOIM | Input/Output Image Memory |
| IP | Instruction Pointer |
| NP | Numerical Processor |
| PAL | Programmable Array Logic |
| PC | Programmable Controller |
| WCP | Worst Case Program |

TABLE 2

| Circuit Element Designations | | | |
|---|---|---|---|
| Reference Number | Component Type | Component Model | Sheet In Microfiche |
| U4 | microprocessor | 8086 | 1 |
| U7 | microprocessor | 8051 | 1 |
| U6 | transparent latch | 74F373 | 2 |
| U8 | " | " | 2 |
| U18 | " | " | 2 |
| U90 | counter | 74LS163 | 4 |
| U100 | multiplexer | 74LS157 | 4 |
| U87 | counter | 74LS163 | 2 |
| U88 | " | " | 2 |
| U98 | " | " | 2 |
| U99 | " | " | 2 |
| U89 | buffer | 74F244 | 2 |
| U107 | " | " | 2 |
| U150 | 8K × 8 RAM | 5564PL-1 | 18 |
| U151 | " | " | 18 |
| U152 | 8K × 8 ROM | 2764 | 19 |

TABLE 2-continued

| Circuit Element Designations | | | |
|---|---|---|---|
| Reference Number | Component Type | Component Model | Sheet In Microfiche |
| U153 | " | " | 19 |
| U154 | " | " | 19 |
| U155 | " | " | 19 |
| U115 | bus transceiver | 74LS245 | 4 |
| U122 | " | " | 4 |
| U3 | bus transceiver | 74LS245 | 2 |
| U16 | " | " | 2 |
| U17 | " | " | 2 |
| U111 | buffer | 4010 | 14 |
| U114 | latch | 74LS373 | 14 |
| U113 | buffer | 7407 | 14 |
| U121 | " | " | 14 |
| U112 | " | 14503 | 14 |
| U120 | " | " | 14 |
| U129 | shift register | 74S299 | 6 |
| U143 | buffer | 26LS31 | 7 |
| U142 | buffer | 26LS32 | 7 |
| U116 | transparent latch | 74LS273 | 5 |
| U123 | " | " | 5 |
| U32 | decoder | 74LS138 | 11 |
| U91 | " | " | 11 |
| U79 | 3-input NAND | 74LS10 | 5 |
| U80 | quad D-type flip-flop | 74LS175 | 5 |
| U81 | 2-input NOR gate | 74LS02 | 5 |
| U82 | 3-input NAND | 74S10 | 5 |
| U59 | counter | 74LS163 | 6 |
| U45 | octal D flip-flop | 74LS273 | 10 |
| U60 | " | " | 10 |
| U62 | 4K × 1 RAM | 6147LP | 6 |
| U63 | " | " | 6 |
| U64 | " | " | 6 |
| U65 | " | " | 6 |
| U75 | XOR gates (3) | 74LS86 | 6 |
| U77 | XOR gates (3) | 74LS86 | 6 |
| U76 | quad D-type flip-flop | 74LS175 | 6 |
| U73 | multiplexer | 74LS157 | 6 |
| U56 | multiplexer | 74LS157 | 10 |
| U70 | 16 × 4 memory | 74S189 | 9 |
| U86 | multiplexer | 74LS153 | 9 |
| U97 | " | " | 9 |
| U85 | multiplexer | 74S153 | 9 |
| U71 | quad 2-port register | 74LS298 | 9 |
| U5 | transceiver | 74LS245 | 1 |
| U57 | multiplexer | 74LS157 | 9 |
| U58 | " | " | 9 |
| U42 | 4-bit counter | 74LS163 | 9 |
| U43 | " | " | 9 |
| U46 | PAL 16L8 | 82S153 | 10 |
| U47 | PAL 16R6 | 82S157 | 10 |
| U53 | decoder | 74S139 | 10 |
| U48 | multiplexer | 74LS151 | 10 |
| U21 | 3-input NAND | 74S10 | 2 |
| U10 | inverter | 74S04 | 2 |
| U49 | D-type flip-flop | 74S74 | 12 |
| U36 | 4-input NAND | 74LS20 | 12 |
| U22 | JK flip-flop | 74S113 | 11 |
| U31 | 1-of-8 decoder | 74S138 | 11 |

TABLE 3

Instruction Execution
The following outlines the execution of all the BP instructions for each of the three phases. In these charts the names between parentheses shows that it is a BAM bit. SB and NB are the SBAM and NEWBIT flip-flops in PAL 16R6 (U47).

| | BPPH1 | BPPH2 | BPPH3 |
|---|---|---|---|
| STACK | LDRIM | NB ← T.I | (DR) ← NB |
| | DR ← DR + 1 | — | IP ← IP + 1 |
| | SB ← (S) | — | T ← N |
| AND D | LDRIM | NB ← F((DR),T,I) | (DR) ← NB |
| AND-OR D | SB ← (S) | — | IP ← IP + 1 |
| AND T | — | — | T ← N |
| INIT S,D | SB ← (S) | NB ← (DR) | (DR) ← NB |
| If D = 0 | — | — | IP ← IP + 1 |
| or 1. | — | — | T ← SB |
| | — | — | N ← SB |

TABLE 3-continued

Instruction Execution
The following outlines the execution of all
the BP instructions for each of the three phases. In
these charts the names between parentheses shows that
it is a BAM bit. SB and NB are the SBAM and NEWBIT
flip-flops in PAL 16R6 (U47).

|  | BPPH1 | BPPH2 | BPPH3 |
|---|---|---|---|
| INIT S,D | DR ← D | NB ← 0 | (DR) ← NB |
| If D ≠ 0 | SB ← (S) | — | IP ← IP + 1 |
| or 1. | — | — | T ← SB |
|  | — | — | N ← SB |
| AND S,D | DR ← D | NB ← F((DR),SB) | (DR) ← NB |
| OR S,D | SB ← (S) | — | IP ← IP + 1 |
| NOT S,D | — | — | T ← 1 |
|  | — | — | N ← 1 |
| MODE | — | — | EDGE ← 1 |
| EDGE | — | — | IP ← IP + 1 |
| MODE | — | — | OUTPUT ← 1 |
| OUTPUT | — | — | IP ← IP + 1 |
|  | — | — | DR ← D |
| MODE NOP | — | — | IP ← IP + 1 |
| OUTPUT | LDRIM | WIOIM | WIOIM |
| LIST | DR ← DR + PIPE14 | — | OUTPUT ← -PIPE15 |
|  | SB ← (DR) | — | IP ← IP + 1 |
| NPCALL | — | — | — |

TABLE 4A

PAL 16L8 (U46) Pinouts

| Pin | I/O | Name of Signal |
|---|---|---|
| 1 | I | -BP1 |
| 2 | I | -BP0 |
| 3 | I | NEXECBP |
| 4 | I | ALARMBP |
| 5 | I | -OUTPUT |
| 6 | I | PIPE15 |
| 7 | I | PIPE14 |
| 8 | I | PIPE13 |
| 9 | I | PIPE12 |
| 11 | I | PIPE00 |
| 12 | O | -(I + SD + NPCALL) |
| 13 | I | (D = 0or1) |
| 14 | O | MODE |
| 15 | O | -WIOIMFRBP |
| 16 | O | RTNTONP |
| 17 | O | -INCDR/OUT |
| 18 | O | -LDDRBP |
| 19 | O | -WRBAM/TN |

TABLE 5A

PAL 16R6 (U47) Pinouts

| Pin | I/O | Name of Signal |
|---|---|---|
| 2 | I | (T*I) |
| 3 | I | BITBAM |
| 4 | I | (D = 0or1) |
| 5 | I | PIPE15 |
| 6 | I | PIPE13 |
| 7 | I | PIPE12 |
| 8 | I | RIMD |
| 9 | I | WRTN |
| 12 | I | CPTBP |
| 19 | O | OUTBITBP |
| 18 | O | -T |
| 17 | O | -N |
| 16 | O | -SBAM |
| 15 | O | -NEWBIT |
| 14 | O | -BP1 |
| 13 | O | -BP0 |

TABLE 4B

PAL 16L8 (U46) Equations

| | |
|---|---|
| (I + SD + NPCALL) = | -NEXECBP*-ALARMBP*-OUTPUT*PIPE15 + <br> -NEXECBP*-ALARMBP*-OUTPUT*PIPE14 + <br> -NEXECBP*-ALARMBP*-OUTPUT*PIPE13 |
| -MODE = | NEXECBP + ALARMBP + OUTPUT + <br> PIPE12 + PIPE13 + PIPE14 + PIPE15 |
| WIOIMFRBP = | -NEXECBP*-ALARMBP*OUTPUT*BP0 |
| -RTNTONP = | NEXECBP + -ALARMBP*OUTPUT + <br> -ALARMBP*-PIPE13 + -ALARMBP*PIPE14 + <br> -ALARMBP*PIPE15 + BP1 + -BP0 |
| INCDR/OUT = | -NEXECBP*-ALARMBP*-OUTPUT*PIPE15* <br> -PIPE13*-PIPE12*-BP1*BP0 + <br> -NEXECBP*-ALARMBP*OUTPUT*PIPE14*-BP1*BP0 + <br> -NEXECBP*-ALARMBP*-OUTPUT*-PIPE15* <br> -PIPE14*-PIPE13*-PIPE12*PIPE00*BP1 + <br> -NEXECBP*-ALARMBP*OUTPUT*-PIPE15*BP1 |
| LDDRBP = | -NEXECBP*-ALARMBP*-OUTPUT*-PIPE15* <br> PIPE14*-(D = 0or1)*-BP1*BP0 + <br> -NEXECBP*-ALARMBP*-OUTPUT*-PIPE15* <br> PIPE14*-PIPE13*-BP1*BP0 + <br> -NEXECBP*-ALARMBP*-OUTPUT*-PIPE15* <br> PIPE14*-PIPE12*-BP1*BP0 + <br> -NEXECBP*-ALARMBP*-OUTPUT*-PIPE15* <br> -PIPE14*-PIPE13*-PIPE12*PIPE00*BP1*-BP0 |
| WRBAM/TN = | -NEXECBP*-ALARMBP*-OUTPUT*PIPE15*BP1*-BP0 + <br> -NEXECBP*-ALARMBP*-OUTPUT*PIPE14*BP1*-BP0 |

TABLE 5B

PAL 16R6 (U47) Equations

| | |
|---|---|
| -OUTBITBP = | -PIPE13*-PIPE12*-SBAM + |
| | -PIPE13*PIPE12*SBAM + |
| | PIPE13*-PIPE12*SBAM + |
| | PIPE13*-PIPE12*-RIMD + |
| | PIPE13*PIPE12*-RIMD*-SBAM |
| T = | WRTN*BP1*-BP0*N*PIPE15*-PIPE13 + |
| | WRTN*BP1*-BP0*N*PIPE15*-PIPE12 + |
| | WRTN*BP1*-BP0*(T*I)*PIPE15*PIPE13*PIPE12 + |
| | WRTN*BP1*-BP0*SBAM*-PIPE15*PIPE13*PIPE12 + |
| | WRTN*BP1*-BP0*-PIPE15*-PIPE13 + |
| | WRTN*BP1*-BP0*-PIPE15*-PIPE12 + |
| | WRTN*BP1*-BP0*-PIPE13 + |
| | -WRTN*T |
| N = | WRTN*BP1*-BP0*N*PIPE15 + |
| | WRTN*BP1*-BP0*SBAM*-PIPE15*PIPE13*PIPE12 + |
| | WRTN*BP1*-BP0*-PIPE15*-PIPE13 + |
| | WRTN*BP1*-BP0*-PIPE15*-PIPE12 + |
| | WRTN*BP1*-BP0*-PIPE12 + |
| | -WRTN*N |
| SBAM = | -BP1*BITBAM + BP1*SBAM |
| NEWBIT = | (T*I)*PIPE15*-PIPE12 + |
| | BITBAM*PIPE15*PIPE13 + |
| | BITBAM*(T*I)*PIPE15 + |
| | BITBAM*-PIPE15*PIPE13*PIPE12*(D = 0or1) + |
| | BITBAM*-PIPE15*-PIPE13*PIPE12 + |
| | SBAM*-PIPE15*-PIPE13*PIPE12 + |
| | BITBAM*SBAM*-PIPE15*PIPE13*-PIPE12 + |
| | -SBAM*-PIPE15*-PIPE13*-PIPE12 |
| BP0 = | CPTBP*-BP0 + -BP1*BP0 |
| BP1 = | BP0 |

TABLE 6A

Overall Memory Map

| Address | | | | | |
|---|---|---|---|---|---|
| | FC000H | | | | FOLDBACK |
| 00000 | | | ⋮ | | |
| 70000 | | | SYSROM EXT | SYSROM0 | |
| 80000 | SYSROM1 | DONE2 | RD_THIP | SYSRAM | |
| 90000 | " FB | " FB | " FB | USER RAM FB | |
| A0000 | USER CARTRIDGE SPACE ... | | | | |
| B0000 | ... | | | BPIP RAM FB | |
| C0000 | USER CARTRIDGE SPACE, FOR NON BP CODE SPACE | | | | |
| D0000 | E.G., DEBUGGING AIDS, ASCII MESSAGES, ETC. | | | | |
| | NON-USEABLE SPACE TO FC000H | | | | |

TABLE 6B

Expanded Map Of System RAM

| Address | Description |
|---|---|
| 8C000: | STEP (a variable which determines where in powerup sequence software is when stopped) |
| 8C002: | Segment address of Command Parameter Segment |
| 8C004: | Segment address of Common Data Segment |
| 8C006: | Offset in CPS of Application Descriptor |
| 8C008: | NMICNT - count of NMIs (NP parity errors) |
| 8C00A: | Reserved for system use |
| 8C010: | Power up stack starts down from 3FH |
| 8C040: | 8051-8086 mail boxes 8051 to 8086 |
| 8C048: | 8051-8086 mail boxes 8086 to 8051 |
| 8C050: | 8050 input buffer (30 Hex bytes) |
| 8C080: | Other console buffers as req'd and cold start stack which counts down from 0FFH |
| 8C100: | Free |

TABLE 6C

Expanded Map Of System ROM

| | |
|---|---|
| 7C000: | Code |
| 7FFF0: | Hardware Reset vector |
| 80000: | Interrupt vectors** |
| 80400: | Code |
| 82000: | Sequencer code |
| 82108: | Code |
| 83000: | EXPANSION NPCALL vectors* for BAM bits 00 |
| 83200: | EXPANSION NPCALL vectors for BAM bits 01 |
| 83400: | EXPANSION NPCALL vectors for BAM bits 10 |
| 83600: | EXPANSION NPCALL vectors for BAM bits 11 |
| 83800: | NPCALL vectors* for BAM bits 00 |
| 83A00: | NPCALL vectors for BAM bits 01 |
| 83C00: | NPCALL vectors for BAM bits 10 |
| 83E00: | NPCALL vectors for BAM bits 11 |
| 83FFE: | Checksum of all code*** |
| 84000: | DONE2: (return to BP) |
| 84002: | DONE3: (return to BP, don't check parity) |
| 88000: | RD_THIP: (read parm using BPIP, BPIP++) |

*NPCALLs must have numbers 00 to FEH to use this space. The expansion NPCALLS are for 100H to 1FFH.
**only the software INTs, 0–A, 32, 34–36, and 255 are presently used. Thus, there will be code mixed in with the INT vectors.

What is claimed is:

1. A co-processing system in which processors share common bus and memory resources, comprising:
   a first processor having a first instruction set including a first special instruction subset;
   a second processor having a second instruction set including a second special instruction subset;
   memory means for storing program instructions belonging to said first and second instruction sets;
   first means, associated with said first processor, for fetching instructions from said memory means during operation of said first processor for execution by said first processor;
   second means, associated with said second processor, for fetching instructions from said memory means during operation of said second processor for execution by said second processor; and
   means for controlling the operation of said processors to allow only one of said processors to operate at a given time, including
   first control passing means, associated with said first processor, for suspending operation of said first processor and commencing operation of said second processor when said first processor encounters an instruction in said first special instruction subset,
   means, associated with said first control passing means, for imposing branching address information on said second processor so as to specify the location of an instruction to be executed by said second processor after control has passed from said first processor to said second processor,
   second control passing means, associated with said second processor for suspending operation of said second processor and commencing operation of said first processor when said second processor encounters an instruction in said second special instruction subset, and
   means, associated with said second control passing means, for imposing branching address information on said first processor so as to specify the location of an instruction to be executed by said first processor after control has passed back from said second processor to said first processor.

2. The co-processing system of claim 1 wherein said first processor is a numeric processor and said second processor is a Boolean processor.

3. The co-processing system of claim 1 wherein:
   said first control passing means operates to suspend operation of said first processor part way through the execution by said first processor of the encountered instruction in said first special instruction subset; and
   said second control passing means operates to cause said first processor to resume operation by permitting said first processor to complete the encountered instruction.

4. The co-processing system of claim 1 wherein:
   said first special instruction subset includes a memory-mapped access instruction having an address operand lying within a specified range;
   said first control passing means operates to suspend operation of said first processor by preventing completion of said memory-mapped access instruction; and
   said second control passing means operates to allow said first processor to complete said memory-mapped access instruction.

5. The co-processing system of claim 4 wherein:
   said memory-mapped access instruction is an indirect branch specifying a destination stored in a location having an address within a specified range; and
   said second control passing means supplies a target address to allow completion of the indirect branch.

6. A programmable controller comprising:
   a numeric processor having a first instruction set including a first special instruction subset;
   a Boolean processor having a second instruction set including a second special instruction subset including subroutine calls;
   memory means for storing program instructions including instructions in said first and second instruction sets;
   first means, associated with said numeric processor, for fetching instructions from said memory means during operation of said numeric processor for execution by said numeric processor;

second means, associated with said Boolean processor, for fetching instructions from said memory means during operation of said Boolean processor for execution by said Boolean processor; and means for controlling the operation of said numeric processor and said Boolean processor to allow only one of said processors to operate at a given time, including first control passing means, associated with said numeric processor, for suspending operation of said numeric processor and commencing operation of said Boolean processor when said numeric processor encounters an instruction in said first special instruction subset, means, associated with said first control passing means for supplying information to said Boolean processor so as to affect the subsequent operation of said Boolean processor, second control passing means, associated with said Boolean processor, for suspending operation of said Boolean processor and commencing operation of said numeric processor when said Boolean processor encounters an instruction in said second special instruction subset, and means, associated with said second control passing means for imposing branching address information on said numeric processor so as to specify the location of an instruction to be executed by said numeric processor after control has passed back from said Boolean processor to said numeric processor.

7. The programmable controller of claim 6 wherein said first special instruction subset includes a memory reference to a location having an address within a specified range.

8. The programmable controller of claim 6 wherein:
said first special instruction subset includes an indirect branch specifying a destination stored in a location having an address within a specified range;
said first control passing means operates to signify that the contents of the addressed location are not yet available, thereby suspending operation of said first processor; and
said second control passing means operates in conjunction with said second processor to provide a data operand specifying a destination address so that said first processor may complete the branch, thereby effecting passage of control to said first processor with said first processor beginning execution at the location specified.

9. A programmable controller comprising:
a numeric processor having a first instruction set including a subset of native memory access instructions and a subset of native I/O instructions, said numeric processor having a READY input adapted to receive logical signals, a logical true signal signifying the completion of a memory or I/O access;
a Boolean processor having a second instruction set including a subset of special BP instructions;
an I/O processor having a third instruction set including a subset of special IOP instructions;
memory means for storing program instructions including instructions belonging to said first, second, and third sets;
first means, associated with said numeric processor, for fetching instructions from said memory means during operation of said numeric processor;
second means, associated with said Boolean processor, for fetching instructions from said memory means during operation of said Boolean processor;
third means, associated with said I/O processor, for fetching instructions from said memory means during operation of said I/O processor;
NP/BP control passing means, responsive to said numeric processor's encountering a native memory access instruction seeking the content of a location having an address within a specified range, for applying a logical false signal at said READY input, thereby suspending the operation of said numeric processor, and for commencing the operation of said Boolean processor;
BP/NP control passing means, responsive to said Boolean processor's encountering a special BP instruction, for suspending the operation of said Boolean processor, and for commencing the operation of said numeric processor by constructing the content sought by said numeric processor and applying a logical true signal at said READY input;
NP/IOP control passing means, responsive to said numeric processor's encountering a native I/O instruction, for applying a logical false signal at said READY input, thereby suspending the operation of said numeric processor, and for commencing the operation of said I/O processor; and
IOP/NP control passing means, responsive to said I/O processor's encountering a special IOP instruction, for suspending operation of said I/O processor, and for commencing operation of said numeric processor by applying a logical true signal at said READY input.

10. The programmable controller of claim 9 wherein:
said native memory access instruction to which said NP/BP control passing means is responsive is an indirect branch; and
the constructed content is the location at which said numeric processor is to commence operation when control passes from said Boolean processor to said numeric processor.

11. The invention of claim 9 wherein said constructed content contains compile-time information and run-time information.

12. A programmable controller comprising:
a numeric processor having a first instruction set including a first special instruction subset;
a Boolean processor having a second instruction set including a second special instruction subset including subroutine calls;
memory means for storing program instructions including instructions in said first and second instruction sets;
first means, associated with said numeric processor, for fetching instructions from said memory means during operation of said numeric processor for execution by said numeric processor;
second means, associated with said Boolean processor, for fetching instructions from said memory means during operation of said Boolean processor for execution by said Boolean processor; and
means for controlling the operation of said numeric processor and said Boolean processor to allow only one of said processors to operate at a given time, including
first control passing means, associated with said numeric processor, for suspending operation of said numeric processor and commencing operation of said Boolean processor when said numeric processor encounters an instruction in said first special instruction subset, means, associated with said first control passing means, for imposing branching information on said Boolean processor so as to determine the subsequent operation of said Boolean processor once control has passed to said Boolean processor, second control passing means, associated with said Boolean processor, for suspending operation of said Boolean processor and commencing operation of said numeric processor when said Boolean processor encounters an instruction in said second special instruction subset, and means, associated with said second control passing means for imposing branching address information on said numeric processor so as to specify the location of an instruction to be executed by said numeric processor after control has passed back from said Boolean processor to said numeric processor.

* * * * *